(12) United States Patent
Merrifield, Jr. et al.

(10) Patent No.: US 8,150,726 B2
(45) Date of Patent: Apr. 3, 2012

(54) LINKING ORGANIZATIONAL STRATEGIES TO PERFORMING CAPABILITIES

(75) Inventors: Eric S. Merrifield, Jr., Seattle, WA (US); Daniel C. Brown, Hellerup (DK); Chad K. Corneil, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 12/242,430

(22) Filed: Sep. 30, 2008

(65) Prior Publication Data

US 2010/0082381 A1 Apr. 1, 2010

(51) Int. Cl.
*G06Q 10/00* (2006.01)
(52) U.S. Cl. ............ 705/7.36; 705/7.37; 705/7.11; 705/7.12; 705/348; 717/100
(58) Field of Classification Search ........ 705/7.11–7.42, 705/348; 717/100–102
See application file for complete search history.

(56) References Cited

U.S. PATENT DOCUMENTS

| | | | |
|---|---|---|---|
| 5,233,513 A | 8/1993 | Doyle | |
| 5,799,286 A | 8/1998 | Morgan | |
| 5,953,707 A | 9/1999 | Huang | |
| 6,151,582 A | 11/2000 | Huang | |
| 6,321,205 B1 * | 11/2001 | Eder | 705/7.37 |
| 6,345,239 B1 | 2/2002 | Bowman-Amuah | |
| 6,560,569 B1 | 5/2003 | Abu El Ata | |
| 6,601,233 B1 * | 7/2003 | Underwood | 717/102 |
| 6,609,120 B1 * | 8/2003 | Honarvar et al. | 1/1 |
| 6,772,216 B1 | 8/2004 | Ankireddipally | |
| 6,778,971 B1 | 8/2004 | Altschuler | |
| 6,873,979 B2 * | 3/2005 | Fishman et al. | 706/21 |
| 6,898,783 B1 * | 5/2005 | Gupta et al. | 717/105 |
| 6,961,756 B1 | 11/2005 | Dilsaver | |
| 6,965,886 B2 | 11/2005 | Gorvin | |
| 7,043,454 B2 | 5/2006 | Powell | |
| 7,120,896 B2 | 10/2006 | Budhiraja | |
| 7,162,427 B1 | 1/2007 | Myrick | |
| 7,243,120 B2 | 7/2007 | Massey | |
| 7,246,144 B2 | 7/2007 | Walsh | |
| 7,251,613 B2 | 7/2007 | Flores et al. | |
| 7,281,235 B2 | 10/2007 | Datta | |
| 7,308,414 B2 | 12/2007 | Parker | |
| 7,308,417 B1 | 12/2007 | Nathan | |

(Continued)

FOREIGN PATENT DOCUMENTS

WO 00/42553 7/2000

(Continued)

OTHER PUBLICATIONS

U.S. Appl. No. 11/361,199, filed Oct. 12, 2010, Office Action.

(Continued)

*Primary Examiner* — Romain Jeanty
*Assistant Examiner* — Alan S Miller
(74) *Attorney, Agent, or Firm* — Workman Nydegger

(57) ABSTRACT

The present invention extends to methods, systems, and computer program products for linking organizational strategies to performing capabilities. Embodiments of the invention include determining what impact proposed capability changes in an initiative/program/project for an organizational strategy have on the organizational strategy's performance. Schema-based representations of organizational strategies and initiatives are used to provide a common vocabulary for describing changes to organizational strategies. Proposed changes can be evaluated against an impact/value contribution curve, potentially on an ongoing basis, to determine their benefit. Corrective action can be taken when operations/tactics are trend outside of specified metrics.

20 Claims, 11 Drawing Sheets

U.S. PATENT DOCUMENTS

| | | | |
|---|---|---|---|
| 7,461,038 B2* | 12/2008 | Kropaczek et al. | 706/19 |
| 7,506,302 B2* | 3/2009 | Bahrami | 717/100 |
| 7,580,913 B2* | 8/2009 | Chandra et al. | 706/62 |
| 7,703,071 B2 | 4/2010 | Kuester | |
| 2001/0053991 A1* | 12/2001 | Bonabeau | 705/7 |
| 2002/0013720 A1 | 1/2002 | Ozono | |
| 2002/0049573 A1 | 4/2002 | El Ata | |
| 2002/0059264 A1 | 5/2002 | Fleming | |
| 2002/0095393 A1* | 7/2002 | McHaney | 706/13 |
| 2002/0103869 A1 | 8/2002 | Goatly | |
| 2002/0133368 A1 | 9/2002 | Strutt | |
| 2002/0138484 A1 | 9/2002 | Bialek | |
| 2002/0186238 A1 | 12/2002 | Sylor | |
| 2002/0198722 A1 | 12/2002 | Yuschik | |
| 2002/0198727 A1* | 12/2002 | Ann et al. | 705/1 |
| 2002/0198800 A1 | 12/2002 | Shamrakov | |
| 2003/0033182 A1* | 2/2003 | Stok et al. | 705/7 |
| 2003/0046123 A1* | 3/2003 | Chen | 705/7 |
| 2003/0084053 A1 | 5/2003 | Govrin | |
| 2003/0216955 A1 | 11/2003 | Miller | |
| 2004/0034496 A1 | 2/2004 | Correll | |
| 2004/0034615 A1 | 2/2004 | Thomson et al. | |
| 2004/0054690 A1 | 3/2004 | Hillerbrand | |
| 2004/0068431 A1* | 4/2004 | Smith et al. | 705/10 |
| 2004/0138933 A1 | 7/2004 | LaComb | |
| 2004/0143470 A1 | 7/2004 | Myrick | |
| 2004/0172319 A1 | 9/2004 | Eder | |
| 2004/0177326 A1 | 9/2004 | Bibko | |
| 2004/0181538 A1 | 9/2004 | Lo | |
| 2004/0230404 A1* | 11/2004 | Messmer et al. | 703/1 |
| 2004/0236618 A1 | 11/2004 | Smith | |
| 2004/0243595 A1 | 12/2004 | Cui | |
| 2005/0021348 A1 | 1/2005 | Chan et al. | |
| 2005/0021433 A1 | 1/2005 | Hyler | |
| 2005/0027752 A1 | 2/2005 | Gelbard | |
| 2005/0033716 A1 | 2/2005 | Ambroz | |
| 2005/0043977 A1 | 2/2005 | Ahern | |
| 2005/0049882 A1 | 3/2005 | Sawka | |
| 2005/0065805 A1 | 3/2005 | Moharram | |
| 2005/0071737 A1 | 3/2005 | Adendorff et al. | |
| 2005/0075914 A1 | 4/2005 | Bayne | |
| 2005/0086189 A1 | 4/2005 | Noble | |
| 2005/0091093 A1 | 4/2005 | Bhaskaran | |
| 2005/0108022 A1 | 5/2005 | Bhattacharya | |
| 2005/0149558 A1 | 7/2005 | Zhuk | |
| 2005/0197969 A1 | 9/2005 | McElroy | |
| 2005/0216320 A1 | 9/2005 | Hattaway | |
| 2005/0222893 A1 | 10/2005 | Kasravi | |
| 2006/0005157 A1 | 1/2006 | Saxena | |
| 2006/0064335 A1 | 3/2006 | Goldszmidt | |
| 2006/0074833 A1* | 4/2006 | Gardner et al. | 706/45 |
| 2006/0111921 A1 | 5/2006 | Chang | |
| 2006/0116919 A1 | 6/2006 | Homann | |
| 2006/0116922 A1* | 6/2006 | Homann et al. | 705/10 |
| 2006/0149764 A1 | 7/2006 | Burchfield | |
| 2006/0167704 A1 | 7/2006 | Nicholls et al. | |
| 2006/0178928 A1 | 8/2006 | Carney | |
| 2006/0206374 A1 | 9/2006 | Asthana | |
| 2006/0224425 A1 | 10/2006 | Homann | |
| 2006/0229922 A1 | 10/2006 | Levy | |
| 2006/0229926 A1 | 10/2006 | Homann | |
| 2006/0235732 A1* | 10/2006 | Miller et al. | 705/7 |
| 2006/0241954 A1 | 10/2006 | Jeng | |
| 2006/0241956 A1 | 10/2006 | Levy et al. | |
| 2006/0242176 A1 | 10/2006 | Tsyganskiy | |
| 2006/0247943 A1 | 11/2006 | Kapoor | |
| 2006/0277156 A1 | 12/2006 | Merican | |
| 2006/0293911 A1 | 12/2006 | Wittmann | |
| 2007/0016886 A1 | 1/2007 | O'Neil | |
| 2007/0021992 A1 | 1/2007 | Konakalla | |
| 2007/0022404 A1 | 1/2007 | Zhang et al. | |
| 2007/0043724 A1 | 2/2007 | Senan | |
| 2007/0067195 A1 | 3/2007 | Fahner | |
| 2007/0078702 A1 | 4/2007 | Tandon | |
| 2007/0094288 A1 | 4/2007 | Enenkiel | |
| 2007/0124184 A1 | 5/2007 | Schmidt | |
| 2007/0143174 A1 | 6/2007 | Tien et al. | |
| 2007/0162496 A1 | 7/2007 | Pulfer | |
| 2007/0174109 A1 | 7/2007 | Cohn | |
| 2007/0174840 A1 | 7/2007 | Sharma | |
| 2007/0203589 A1 | 8/2007 | Flinn | |
| 2007/0203718 A1 | 8/2007 | Merrifield | |
| 2007/0203766 A1* | 8/2007 | Adler et al. | 705/7 |
| 2007/0226163 A1 | 9/2007 | Robles | |
| 2007/0234277 A1 | 10/2007 | Lei et al. | |
| 2007/0250361 A1 | 10/2007 | Hazy | |
| 2008/0120573 A1 | 5/2008 | Gilbert | |
| 2008/0270448 A1* | 10/2008 | Brennan et al. | 707/102 |
| 2009/0112655 A1 | 4/2009 | Stuhec | |

FOREIGN PATENT DOCUMENTS

| | | |
|---|---|---|
| WO | 01/06352 | 1/2001 |

OTHER PUBLICATIONS

Office Action dated Nov. 18, 2009 in U.S. Appl. No. 10/999,852.
Office Action dated Nov. 17, 2009 in U.S. Appl. No. 11/076,142.
Office Action dated Nov. 13, 2010 in U.S. Appl. No. 11/361,199.
Office Action dated Feb. 3, 2009 in U.S. Appl. No. 11/230,206.
Office Action dated Mar. 5, 2009 in U.S. Appl. No. 11/076,142 .
Office Action dated Mar. 5, 2009 in U.S. Appl. No. 10/999,852.
Infosys Technologies Limited, "Enterprise Performance Management Solution", 2007, 1 page.
Navigation Views, "Key Performance Indicators View", Based on information and belief available, at least as early as Nov. 20, 2007, 1 page.
Medicke, John, et al., "Manage Business Performance, Part 2: Retail Scenarios and Business Performance Management Architecture", Jun. 1, 2004, 9 pages.
Office Action dated May 28, 2009 in U.S. Appl. No. 11/094,926.
Office Action dated Jun. 25, 2009 in U.S. Appl. No. 11/112,777.
Office Action dated Sep. 17, 2009 in U.S. Appl. No. 11/230,206.
Office Action dated Oct. 2, 2009 in U.S. Appl. No. 11/094,988.
Wilmot, "Foreign Keys Decrease Adaptability of Database Designs," Comm. ACM, Dec. 1984, vol. 27, No. 12, pp. 1237-1243.
Mathiassen, "Business Agility and Diffusion of Information Technology," 2006, European Journal of Information Systems, vol. 15, pp. 116-119.
Plachy, "Enterprise Solutions Structure," 1999, IBM Systems Journal, vol. 38, No. 1, pp. 4-10.
Noble, "Agile Application-Aware Adaptation for Mobility," Oct. 1997, Proc. 16th ACM Symposium, Op. Sys. Principles.
U.S. Appl. No. 12/187,257, mailed May 19, 2011, Office Action.
U.S. Appl. No. 12/323,086, mailed Jul. 5, 2011, Office Action.
U.S. Appl. No. 12/202,920, filed Sep. 2, 2008, Merrifield.
U.S. Appl. No. 12/206,589, filed Sep. 8, 2008, Merrifield.
U.S. Appl. No. 12/187,257, filed Aug. 6, 2008, Merrifield.
U.S. Appl. No. 12/242,430, filed Sep. 30, 2008, Merrifield.
U.S. Appl. No. 12/323,086, filed Nov. 25, 2008, Merrifield.
U.S. Appl. No. 12/242,412, filed Sep. 30, 2008, Merrifield.
IBM, "Orchestrating Brilliance Managing Innovation in an On-Demand World", Based on Information and belief available, at least as early as Nov. 2, 2007, 3 Pages.
Matheson, Lona, "Identifying the Strategic Opportunities of E-Business Innovation", Aug. 2006, 3 Pages.
Business Victoria—Managing & Improving Your Business—Innovation, Based on Information and belief available, at least as early as Nov. 2, 2007, 3 Pages.
Shemi, Arvindra et al., "Service Oriented Modeling for Connected Systems", Architecture Journal, 2006, Journal 7, 26 pages.
Malhotra, Yogesh, "Integrating Knowledge Management Technologies in Organizational Business Processes: Getting Real Time Enterprises to Deliver Real Business Performance", vol. 9, No. 1, 2005, pp. 7-28, Emerald Group Publishing Limited, Journal of Knowledge Management.
Garnder, Jay M., "Building Business Value Faster with Manage Services", 2005 BMC Software Inc., 8 Pages.
IBM, "Impacting Business Agility with SOA: Highlights of IBM's Recent Announcements", IBM Impact 2007, 4 Pages.
Taylor, James, "Is Business Agility an Oxymoron?" Oct. 4, 2004, 2 Pages.

Computacenter Services, "Outsourcing Enhances Business Agility", 2007, 2 Pages.

Palmer, Mark, "Event Stream Processing & Business Agility", Feb. 16, 2006, 4 Pages.

ING. M.G. (Rine) le Comte BSc., "Business Processes and Workflow Management in an Enterprise Resource Planning Content", OOPSLA 1997, Atlanta, Business Object Workshop III, 5 Pages.

Nayak, N., et al., IBM Systems Journal, "Core Business Architecture for a Service-Oriented Enterprise", Accepted for Publication Jun. 12, 2007; Published Online Sep. 27, 2007, 17 Pages.

Deloitte, "Service-Enabled Enterprise Resource Planning: Challenging the Boundaries of Traditional Packaged Application to Deliver Business Value", 2006, 11 Pages.

Franke, Jochen, et al., "Bridging the Gap: Linking IT-Infrastructure and Business Processes", 2004, 8 Pages.

Homann, Ulrich, "A Business-Oriented Foundation for Service Orientation", Feb. 2006, 9 Pages.

Merrifield, Ric and Tobey, Jon; "Motion Lite: A rapid Application of the Business Architecture Techniques Used by Microsoft Motion", May 2006, 20 Pages.

Starta Development Inc. "The Tools You Need: Business Innovations" Printed from http://www.startadevelopment.com/r.sh?content=BusinessInnovations on Nov. 7, 2007; 5 Pages.

Nagumo, Toshida; "Innovative Business Models in the Era of Ubiquitous Networks" NPL Papers No. 49, Jun. 1, 2002, Copyright 2002 by Nomura Research Institute, Ltd.

Li, Hua Huang and Yu, Yang Cai; "Organization and Management Innovation", (Dept. of Information Management and Information Systems, Research Center of E-Business, School of Management, Fudan University, Shanghai 200433) Printed Nov. 7, 2007.

Kotelnikov, Vadim; "Business Innovation: Reinventing Your Business and Competitive Rules" Printed from http://www.1000ventures.com/business_guide/innovation_business.html, Nov. 7, 2007.

Office Action dated Nov. 10, 2008 in U.S. Appl. No. 11/094,926.

Office Action dated Sep. 01, 2011 cited in U.S. Appl. No. 12/202,920 (Copy Attached).

Office Action dated Sep. 06, 2011 cited in U.S. Appl. No. 12/242,412 (Copy Attached).

Office Action dated Sep. 09, 2011 cited in U.S. Appl. No. 12/187,257 (Copy Attached).

Office Action dated Oct. 12, 2011 cited in U.S. Appl. No. 11/361,199 (Copy Attached) 7.

Office Action dated Oct. 07, 2011 cited in U.S. Appl. No. 12/206,589 (Copy Attached).

\* cited by examiner

LINKING ORGANIZATIONAL STRATEGIES TO PERFORMING CAPABILITIES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many business related processes are distributed across a number of different computer systems and/or a number of different computing components.

The ability of an organization to understand the detailed activities that take place to implement enterprise wide strategies is important to staying competitive in a given field. The need for this understanding is often useful when evaluating an enterprise strategies to identify under performing or over performing business units, new competing products, regulatory changes, etc., that might be impacting performance of the enterprise strategy. However, in many organizations, there is no expressly defined link between or visibility of an enterprise strategy and business components that drive the enterprise strategy. Thus, it is difficult for an organization when a particular business component is preventing successful realization of an enterprise strategy.

In some organizational environments, executives define a strategy based on best and current information. However once strategy is defined, there is no measured or schematized way to promulgate the strategy down to the tactical operational level of the organization. The language of process is insufficient because it is highly subjective, and because it lacks a common schema, there is no simple way to link strategy to process down to any truly actionable level of depth. Another issue with process, because of its inherent subjectivity and lack of common schema and metrics, is that it doesn't help much in discussions with other departments or other organizations. This can be highly detrimental for organizations, since many organizations measure success based on effectively working across corporate boundaries. Thus, when an event impacting lower level business components occurs (either internally or externally), it can be often difficult to know whether that event can or will also have an impact on strategy and goals, even reactively, let alone pro actively.

BRIEF SUMMARY

The present invention extends to methods, systems, and computer program products for linking organizational strategies to performing capabilities. Embodiments of the invention include determining what impact proposed capability changes in an initiative/program/project for an organizational strategy have on the organizational strategy's performance. A computer architecture accesses a schema-based model for an organization. The schema-based model models a plurality of interrelated business capabilities for the organization. Each business capability represents a portion of what work the organization does. The work of some subset of the business capabilities contributes to the organizational strategy.

The computer architecture accesses a schema-based representation of the organizational strategy. The schema-based representation of the organizational strategy defined in accordance with a strategy schema. The strategy schema defines various attributes for organizational strategies, including: defining at least metrics (e.g. key performance indicators) for evaluating the performance of the organizational strategy and defining schema-based links to the subset of business capabilities that contribute to the performance of the organizational strategy.

The computer architecture accesses a schema-based initiative to implement a portion of the organizational strategy. The schema-based initiative defines planned changes to one or more of the subset of business capabilities. The computer architecture determines that the performance improvement from planned changes to one or more of the subset of business capabilities outweighs the cost of the planned changes to the one of more of the subset of business capabilities.

The determination includes simulating the planned changes to the one or more of the subset of business capabilities of the schema-based initiative. The determination also includes determining property values for the schema-based links for the selected subset of capabilities. The property values are determined from the performance of the subset of business capabilities based on the simulated planned changes to the one of the subset of business capabilities. The determination also includes calculating the metrics for the organizational strategy from the property values for the schema-based links. The determination also includes comparing the calculated metrics to planned performance changes for the organizational strategy to determine the actual impact that the planned changes to one or more of the subset of business capabilities has on the performance of the organizational strategy. The computer architecture applies the planned changes to the one or more of the subset of business capabilities in response to the determination so as to improve the performance of the organizational strategy.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
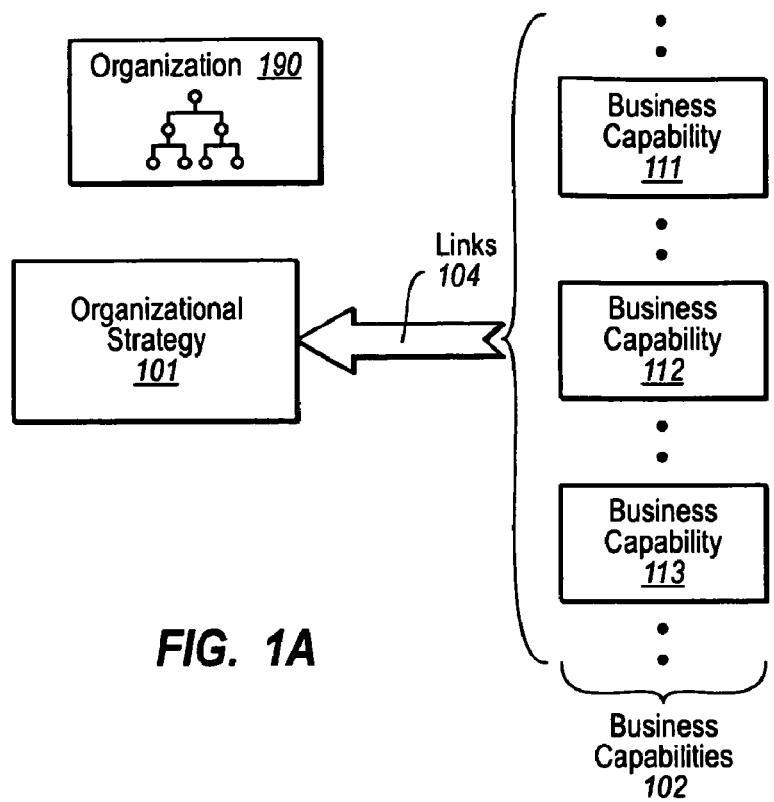
FIG. 1A illustrates an example computer architecture that facilitates linking business capabilities to an organizational strategy.

The present invention extends to methods, systems, and computer program products for linking organizational strategies to performing capabilities. Embodiments of the invention include determining what impact proposed capability changes in an initiative/program/project for an organizational strategy have on the organizational strategy's performance. A computer architecture accessing a schema-based model for an organization. The schema-based model models a plurality of interrelated business capabilities for the organization. Each business capability represents a portion of what work the organization does. The work of some subset of the business capabilities contributes to the organizational strategy.

The computer architecture accessing a schema-based representation of the organizational strategy. The schema-based representation of the organizational strategy defined in accordance with a strategy schema. The strategy schema defines various attributes for organizational strategies, including: defining at least metrics (e.g. key performance indicators) for evaluating the performance of the organizational strategy and defining schema-based links to the subset of business capabilities that contribute to the performance of the organizational strategy.

The computer architecture accesses a schema-based initiative to implement a portion of the organizational strategy. The schema-based initiative defining planned changes to one or more of the subset of business capabilities. The computer architecture determines that the performance improvement from planned changes to one or more of the subset of business capabilities outweighs the cost of the planned changes to the one of more of the subset of business capabilities.

The determination includes simulating the planned changes to the one or more of the subset of business capabilities of the schema-based initiative. The determination also includes determining property values for the schema-based links for the selected subset of capabilities. The property values are determined from the performance of the subset of business capabilities based on the simulated planned changes to the one of the subset of business capabilities. The determination also includes calculating the metrics for the organizational strategy from the property values for the schema-based links. The determination also includes comparing the calculated metrics to planned performance changes for the organizational strategy to determine the actual impact that the planned changes to one or more of the subset of business capabilities has on the performance of the organizational strategy. The computer architecture applies the planned changes to the one or more of the subset of business capabilities in response to the determination so as to improve the performance of the organizational strategy.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the can include a variety of components that are connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, a business capability indicates "what" work is performed, such as, for example, "Purchase Goods". Entities that contribute to the performance of a capability indicate "how" work is performed, such as, for example, an employee uses an software application to generate a request for proposal ("RFP") and sends the RFP to prospective sellers, a Web service receives bids from prospective sellers, employees and automated analysis tools interact to evaluate received bids and identify a small subset of the best bids, a management committee then conducts a review process over small subset, a final selected bid is approved by the CEO, the final selected bid is then forwarded to purchasing, purchasing uses a Web service to purchase goods from the winning organization.

Thus, entities that indicate how work is performed can be distributed across a number of different layers within an organization. Generally, a business capability indicates "what" work is performed and entities within various business layers indicate "how" work is performed. Entities can be spread across a variety of different business layers including a technology layer, a process layer, a people layer, a compliance/regulation layer, a project layer, other organization and/or industry defined layers, etc. Entities from different layers can blend together in different ways to formulate a variety of different representations of "how" work is performed.

Multiple different implementations of "how" work is performed can each contribute to "what" work is performed. For example, for an airline, a first combination of entities from various business layers can be blended together to represent online check in, a second different combination of entities from various business layers can be blended kiosk check in, and a third different combination of entities from various business layers can be blended counter check in, for airline flights. Each of online check in, kiosk check in, and counter check in can contribute to a business capability for checking in passengers.

FIG. 1A illustrates an example computer architecture that facilitates linking business capabilities 102 to organizational strategy 101. Business capabilities 102 include a plurality of business capabilities included business capabilities 111, 112, and 113. Each of business capabilities 111, 112, and 113 can each be part of a model that models the business architecture for organization 190. A business capability's contribution to organizational strategy 101 is modeled in a schema-defined link from the business capability to organizational strategy. For example, links 104 link the contributions of business capabilities 102 to organizational strategy 101. Values on links 104 indicate contributions of business capabilities to organizational strategy 101.

An organization can be virtually any type of business related entity, such as, for example, a corporation (profit or non-profit), a partnership, a limited partnership ("LP"), a limited liability partnership ("LLP"), a limited liability corporation ("LLC"), a sole proprietorship, etc. A business architecture can include both internal (controlled by organization 190) and external (not controlled by organization 190) business capabilities. Thus, both external and internal business capabilities can contribute to the performance of organizational strategy 101.

Figure 1B:
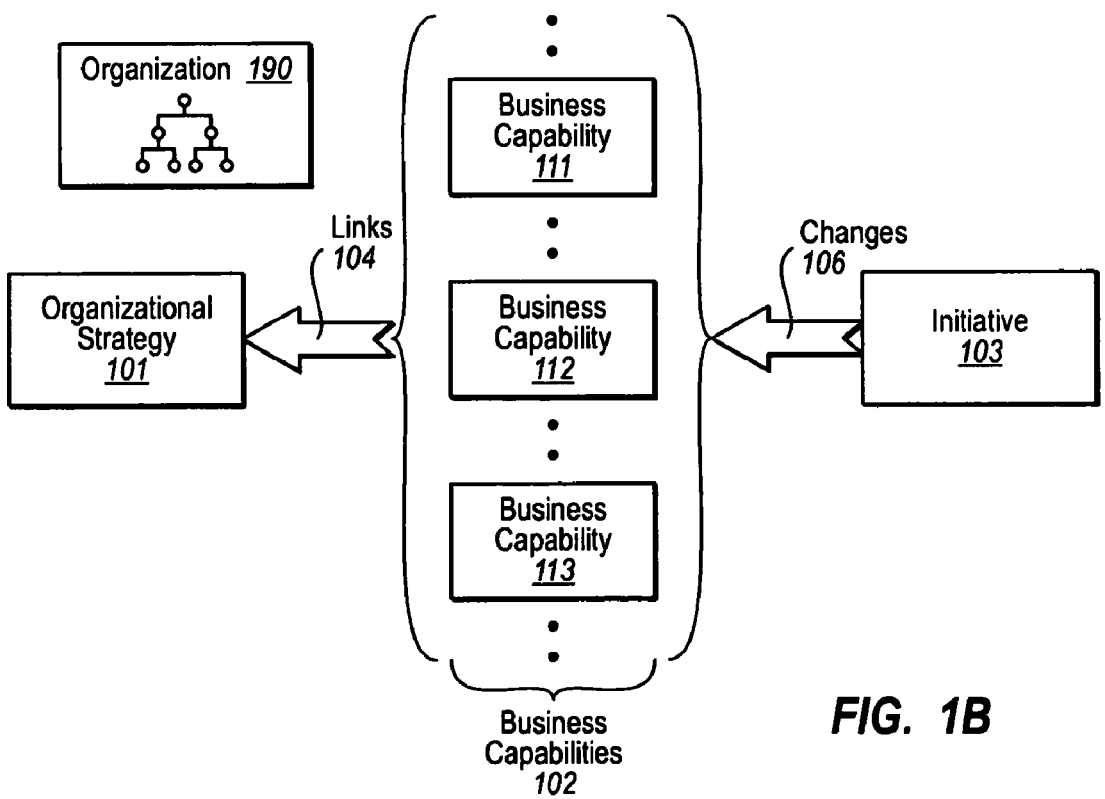
FIG. 1B illustrates an example computer architecture that facilitates changing business capabilities that are linked to an organizational strategy.

Once an organizational strategy is defined, various initiatives, programs, projects (hereinafter referred to collectively as "initiatives"), etc., can be considered, proposed, and/or implemented to realize the organizational strategy. Initiatives can indicate changes to business capabilities. FIG. 1B illustrates an example computer architecture that facilitates changing business capabilities 102 that are linked to organizational strategy 101. As depicted, initiative 103 can indicate changes 106 to business capabilities 102. As a result of changes 106, the contributions of business capabilities 102 to organizational strategy 101 can also change. For example, values on links 104 can change.

In some embodiments, business models and data format definitions for business capabilities are generally described as indicated in Table 1.

TABLE 1

| | |
|---|---|
| Models | Models serve to group capabilities into distinct groups that describe a single business. Models can contain all the capabilities defined for the business as well as how any defined capabilities relate to each other in terms of hierarchical decomposition and process flow relationships. Models facilitate the segmentation of data in a repository into distinct business models which can be compared with one another but are separate from each other. Further, while capability data is defined within a model, other data elements of the data model are outside of the model and facilitate the comparison of different models with one another. |
| Capabilities | Capabilities are individual business functional areas that are modeled in at least three different ways in the model. Capabilities can be modeled as individual things with their own set of properties; as a decomposition hierarchy of functional areas; and as connected in simple business process flows. Coarser (or higher level) capabilities can include a set of more granular (or lower level) capabilities, such as, for example, when a higher level capability is decomposed into its constituent parts. The assignment of properties to capabilities may occur at |

TABLE 1-continued

| | |
|---|---|
| | multiple levels in a hierarchy, which can be used to control later data transformations. For example, when a higher level capability is manipulated through a transformation, corresponding lower level capabilities' properties can be considered in the transformation |
| Capability Inputs and Outputs | Capability Inputs and Outputs are the artifacts and events that are consumed and/or produced by business capabilities. They represent what is outward and visible about the behavior of the capabilities. Inputs can be consumed and outputs can be produced independently of other inputs and outputs. For example, there is no requirement that all the inputs for a capability be consumed before the capability starts. Likewise, there is no requirement that all the processing of a capability be completed before an output can be produced. |
| Processes | Processes are networks of business capabilities that are connected in a flow to illustrate and end-to-end view of a business process. Processes define the connections between capabilities that enable larger business functions. Processes modeled in the data model can refer to cross- |

TABLE 1-continued

| | |
|---|---|
| | capability processes that represent traversal of boundaries between capabilities. Further, each implementation of a capability is also a network of processes. For example, a capability can be part of a process. The part of the process can include further, limited scope, capabilities. Accordingly, process and capability can be view as decomposing at essentially the same rate. |
| Connections | Connections are used to represent relationships between business capabilities. Connections can be data connections over which data, such as, for example, a business document, can flow between those capabilities. However, other types of connections are also possible. Connections may also refer to oversight or management of a business function, as frequently occurs in regulated areas of business activity. Connections can be typed such that connection types are the same across all models. Typed connections can be used to facilitate model comparisons. |
| Service Levels | Service levels refer to the general expectation of the performance of a capability. Service levels attach performance and accountability attributes to a capability in varying degrees of formality (e.g., contractual) and time (e.g., historical, current, target, and maximum). In some embodiments, a capability includes a verb and noun phrase (or such a verb-noun phrase can be construed from the capability description). Service level descriptive data |

TABLE 1-continued

| | |
|---|---|
| | associated with the capability indicates how well the capability performs the action implied by the phrase. For example, Approve Loan Application might have a service level expectation of 2 days. |

Figure 2:
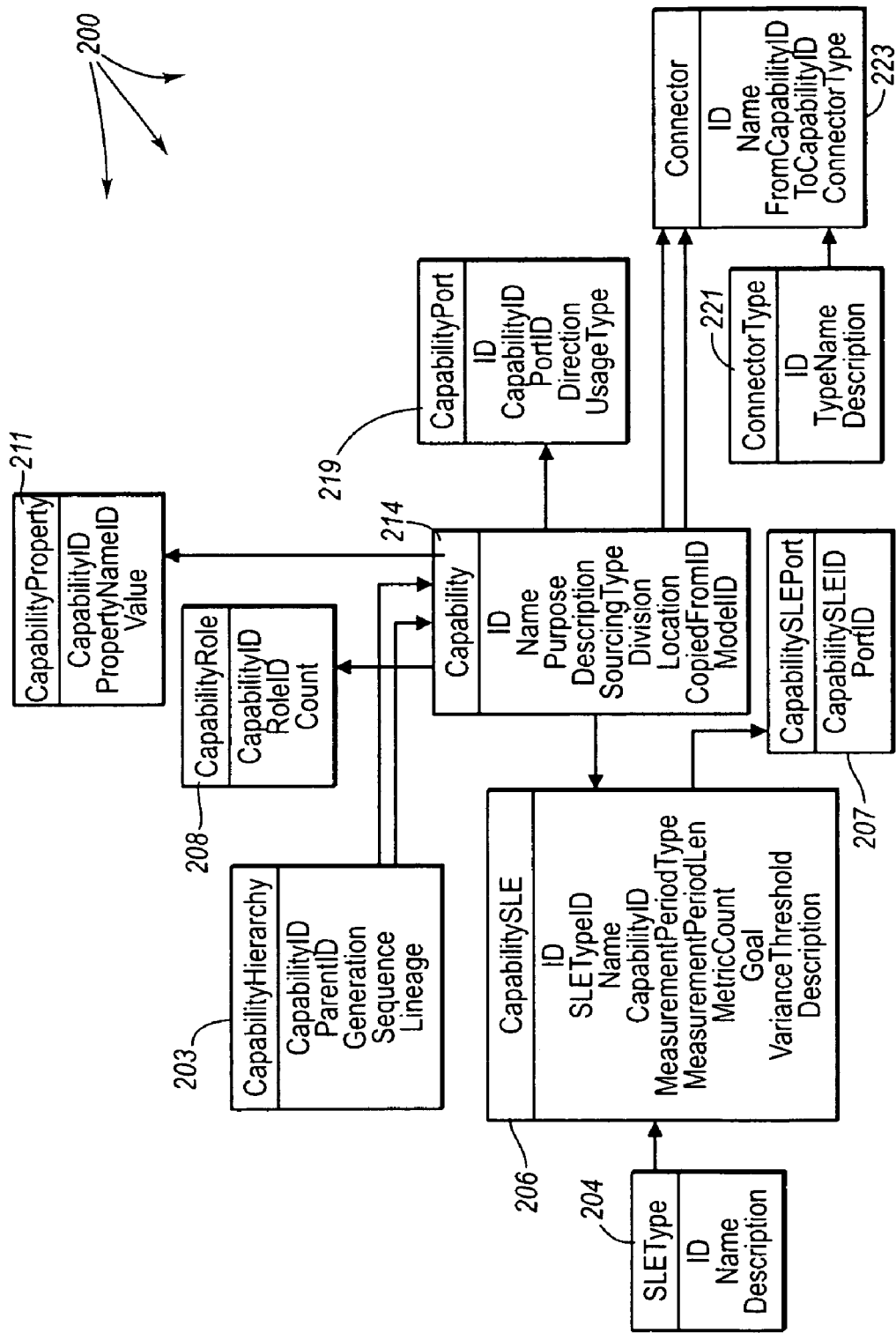
FIG. 2 illustrates a portion of an example capability modeling schema that can be used for efficiently and flexibly business modeling based upon structured business capabilities.

FIG. 2 illustrates a portion of an example capability modeling schema that can be used for efficiently and flexibly business modeling based upon structured business capabilities. Capability modeling schema 200 can include data formats for modeling business capability properties, business capability inputs and outputs, business capability processes, business capability connections, and business capability service level expectations. It should be understood that business capability modeling schema 200 can be one of a plurality of schemas that includes data definitions for modeling a corresponding portions of an organization.

Depicted in FIG. 2, schema 200 includes capability data format 214. Generally, capability data format 214 can be described as indicated in Table 2.

TABLE 2

| Name | Data Type | Description |
|---|---|---|
| ID | int | Key to the capability and is used to relate other data entities to this capability. |
| Name | varchar(256) | Name that is unique within a particular model. |
| Purpose | varchar(1000) | Short description of the capability. |
| Description | varchar(8000) | A more detailed description of the capability and may explain relationships and properties of this capability as well as the capability itself |
| SourcingType | int | This field can have three values: Internal, Outsourced, or Both. It indicates whether or not the capability is performed by an organization that is internal (part of) the organization that "owns" the model; or an organization that is a supplier of the capability to the "owner" of the model; or it is performed by both internal and external suppliers. |
| Division | varchar(100) | Identifies the business organizational area where a capability is performed. |
| Location | varchar(100) | Geographical location where the capability is performed. |
| CopiedFromID | int | Indicates the specific capability (and hence template model) from which this capability was copied. Can be a system-set value. |
| ModelID | int | Indicates the model to which this capability belongs. |

Depicted in FIG. 2, schema 200 includes capability hierarchy data format 203. Generally, capability hierarchy data format 203 can be described as indicated in Table 3.

TABLE 3

| Name | Data Type | Description |
|---|---|---|
| CapabilityID | int | Links to a capability. |
| ParentID | int | Links to a capability in the same model and indicates the parent of this capability in a hierarchical view of the model's capabilities. |
| Generation | int | Part of the lineage key which is used in certain queries. |
| Sequence | int | Part of the lineage key which is used in certain queries. |
| Lineage | varchar(20) | Indicates the entire ancestral lineage of a capability and used to perform hierarchical sorts. |

Depicted in FIG. 2, schema 200 includes capability property data format 211. Generally, capability property data format 211 can be described as indicated in Table 4.

TABLE 4

| Name | Data Type | Description |
| --- | --- | --- |
| CapabilityID | int | Links to a capability. |
| PropertyNameID | int | Links to a user-defined property. |
| Value | varchar(250) | Value of the property for this capability. |

Depicted in FIG. 2, schema 200 includes capability port data format 219. Generally, capability port data format 219 can be described as indicated in Table 5.

TABLE 5

| Name | Data Type | Description |
| --- | --- | --- |
| ID | int | Key to the capability port and is used to relate this port to other entities. |
| CapabilityID | int | Links to the capability that is referenced by this relationship. |
| PortID | int | Links to the port that is referenced by this relationship. |
| Direction | int | Has three values and indicates whether or not the item is input into the referenced capability, output from the referenced capability, or it flows both directions. |
| UsageType | int | Links to the UsageType entity and indicates how the capability uses this item. Examples are "Read only", "Read and update", "Create", etc. |

Depicted in FIG. 2, schema 200 includes capability role data format 308. Generally, capability role data format 208 can be described as indicated in Table 6.

TABLE 6

| Name | Data Type | Description |
| --- | --- | --- |
| CapabilityID | int | References a specific capability and serves to link that capability with a specific role. |
| RoleID | int | References a specific role and links it to the referenced capability. |
| Count | int | Indicates the number of people in this role that are required to perform this capability. A value of '0' indicates that the role participation has not been quantified. |

Depicted in FIG. 2, schema 200 includes SLE type data format 204. Generally, SLE type data format 204 can be described as indicated in Table 7.

TABLE 7

| Name | Data Type | Description |
| --- | --- | --- |
| ID | int | Key to the SLEType entity and is used to relate this role to CapabilitySLE entities. |
| Name | varchar(100) | Uniquely names the type of service level that is described in this entity. This entity is assumed to be read-only by modelers because the modeling tools rely on the value of these entries to visualize service levels. Some values for service level types include "Duration", "Throughput", "Monetary Cost", "Time Cost" and "Concurrency". |
| Description | varchar(4000) | A detailed description of the service level type and how to describe specific service levels related to capabilities. |

Depicted in FIG. 2, schema 200 includes Capability SLE data format 206. Generally, Capability SLE data format 206 can be described as indicated in Table 8.

TABLE 8

| Name | Data Type | Description |
| --- | --- | --- |
| ID | int | Key to the Role entity and is used to relate this role to Capability entities. |
| SLETypeID | int | References the SLEType entity and identifies a specific way to measure a service level. |
| Name | varchar(50) | A unique name for the service level definition. |
| CapabilityID | int | References the capability to which this service level applies. |
| MeasurementPeriodType | varchar(50) | Names the unit of measure for the service level. For "Duration" type service levels, this should be a time period. For a "Monetary Cost" SLE type, "Dollars" or "Thousands of dollars" would be appropriate. |
| MeasurementPeriodLen | int | If the SLE type references a "Throughput" type of SLE, this field indicates the length of the measurement period for throughput. |
| MetricCount | int | An actual (current status/performance or historical performance) measurement of the SLE, such as the number of days of duration, the number of items completed for throughput, the amount of dollars for monetary cost, etc. |
| Goal | int | A target for future performance such as the number of days of duration, the number of items completed for throughput, the amount of dollars for monetary cost, etc. |
| VarianceThreshold | int | How much variation in performance (e.g., from a goal) is tolerated before a variation is noted or notification is sent. For example, when a variance threshold is exceeded an electronic mail message can be sent to appropriate management personnel |

TABLE 8-continued

| Name | Data Type | Description |
| --- | --- | --- |
| Description | varchar(2000) | A detailed description of the SLE for this capability. |

Depicted in FIG. 2, schema 200 includes Capability SLE Port data format 207. Generally, Capability SLE port data format 207 can be described as indicated in Table 9.

TABLE 9

| CapabilitySLEID | int | References a particular service level for a specific capability as described in a CapabilitySLE entity. It serves to link a particular service level to a particular input or output item. |
| --- | --- | --- |
| PortID | int | References a particular input or output item of a capability and links a service level to the specific item that is being measured. For example, this might reference mortgage approvals for a duration service level for a mortgage processing capability and the entire service level definition might thereby describe that 100 mortgage approvals are completed every day for the mortgage processing capability. |

Depicted in FIG. 2, schema 200 includes connector type data format 221. Generally, connector type data format 221 can be described as indicated in Table 10.

TABLE 10

| Name | Data Type | Description |
| --- | --- | --- |
| ID | int | Key to the ConnectorType entity and is used to describe the connection type in the Connector entity. |
| TypeName | varchar(50) | A unique name that describes the type of connection. Examples are "Collaborative", "Controlling", "Dependent", etc. |
| Description | varchar(4000) | A detailed description of the connection type and helps modelers understand what connections mean in their models. |

Depicted in FIG. 2, schema 200 includes connector data format 223. Generally, connector data format 223 can be described as indicated in Table 11.

TABLE 11

| Name | Data Type | Description |
| --- | --- | --- |
| ID | int | Key to the Connector entity and indicates the connection between two capabilities. This key is used to link this connection to other entities. |
| Name | varchar(256) | A comment that is associated with this connection between two capabilities. |
| FromCapabilityID | int | References the capability that is the source capability. Depending on the ConnectorType, the meaning of being the source capability may differ slightly. |
| ToCapabilityID | int | References the capability that is the target capability. Depending on the ConnectorType, the meaning of being the target capability may differ slightly. |
| ConnectorType | int | Link to the ConnectorType entity and indicates what the relationship between the two referenced capabilities really means. Examples are "Collaborative", "Controlling", "Dependent", etc. |

It should be understood that schema 200 is merely one example of a business capability modeling schema. It would be apparent to one skilled in the art, after having reviewed this description, that embodiments of the present invention can be used with a wide variety of other business capability modeling schemas, in addition to schema 200. Further, modeling business capabilities does not require that capability attributes for all the data formats in schema 200 be accessible. For example, a capability and connector can be used to model a business capability based on capability data format 214 and connector data format 223, without accessing capability attributes corresponding to other data formats. Thus, schema 200 defines data formats for business capability attributes that are accessed, but does not require that all data formats be populated to generate a business capability model.

Accordingly, in some embodiments, the business capabilities for an organization are included together in a collection of business capabilities (e.g., a business architecture). A collection of business capabilities can be represented as a (e.g., structured or schematized) business capability model. An organization can formulate business capability attributes representing current performance of their collection of business capabilities. A modeling application (not shown) can receive the business capability attributes (e.g., from a business capability business layer) and model the business capability attributes into a business capability model. A business capability model can be represented in a variety of different ways depicting various levels of detail (e.g., up to the level of detail of the business capability attributes). A business capability model can be configured visually for output at a user-interface and/or can be retained as data for further processing.

Figure 3A:
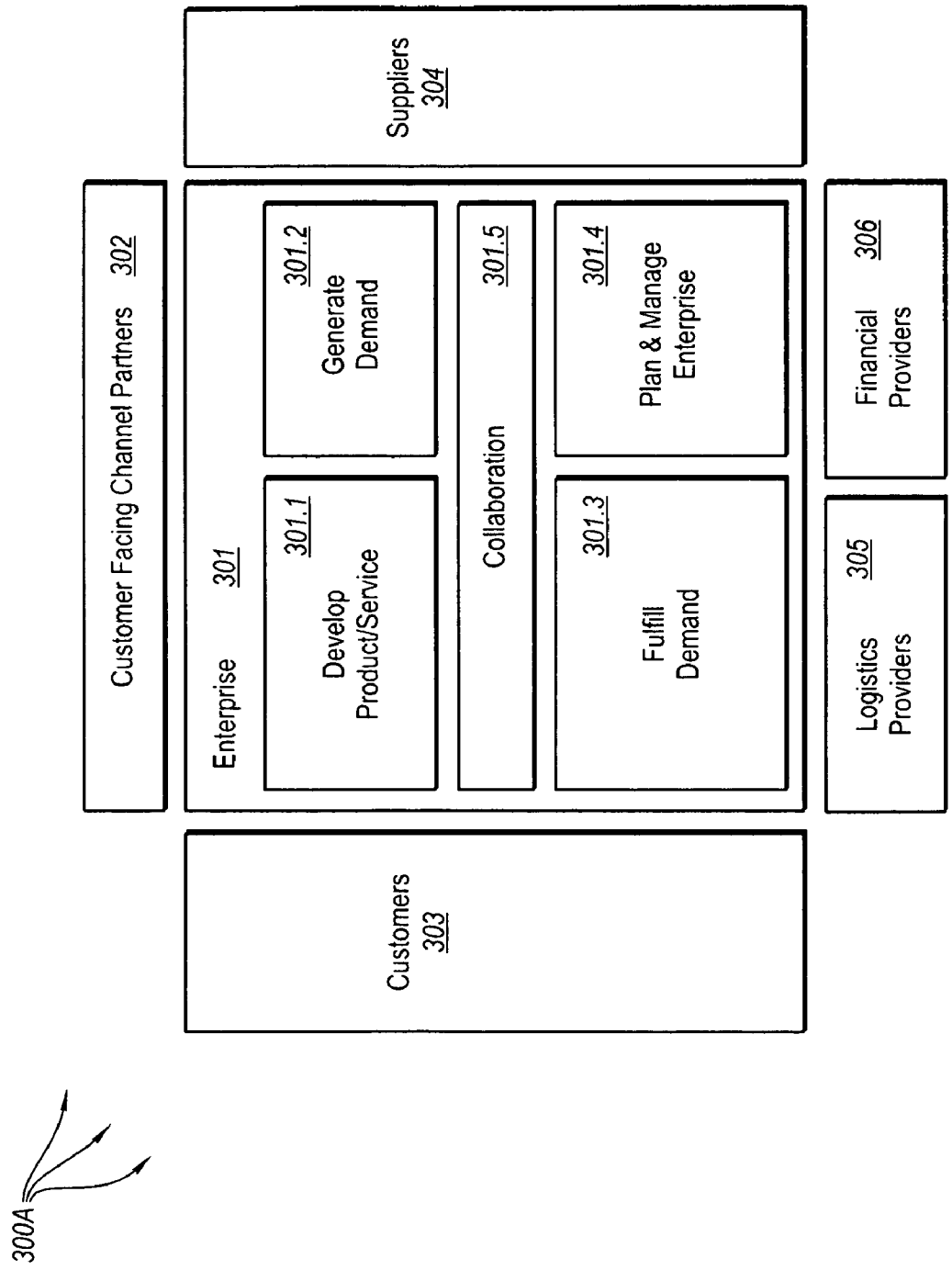
FIGS. 3A and 3B illustrate a visual representation of a collection of business capabilities at varied levels of detail.

Levels of detail can be used to represent (potentially interconnected) sub-capabilities that contribute to the performance other capabilities. FIGS. 3A through 3E depicted collections of business capabilities having various levels of detail and interconnection. Referring now to FIG. 3A, FIG. 3A depicts an example visual representation 300 (e.g., a model) of a collection of business capabilities for an organization. As depicted, the visually rendered business capabilities in visual representation 300 are rendered with varied levels of detail. For example, customer facing channel partners 302, customers 303, suppliers 304, logistic providers 305, and financial providers 306 are rendered with less detail. On the other hand, enterprise 301 is rendered with more detail, depicting other business capabilities that contribute to the performance of enterprise 301. For example, develop product service 301.1, generate demand 301.2, fulfill demand 301.3, plan and manage enterprise 301.4, and collaboration 301.5 are expressly rendered within enterprise 301. Thus, visual representation 3000 represents that develop product service 301.1, generate demand 301.2, fulfill demand 301.3, plan and manage enterprise 301.4, and collaboration 301.5 contribute to the performance of enterprise 301.

Figure 3B:
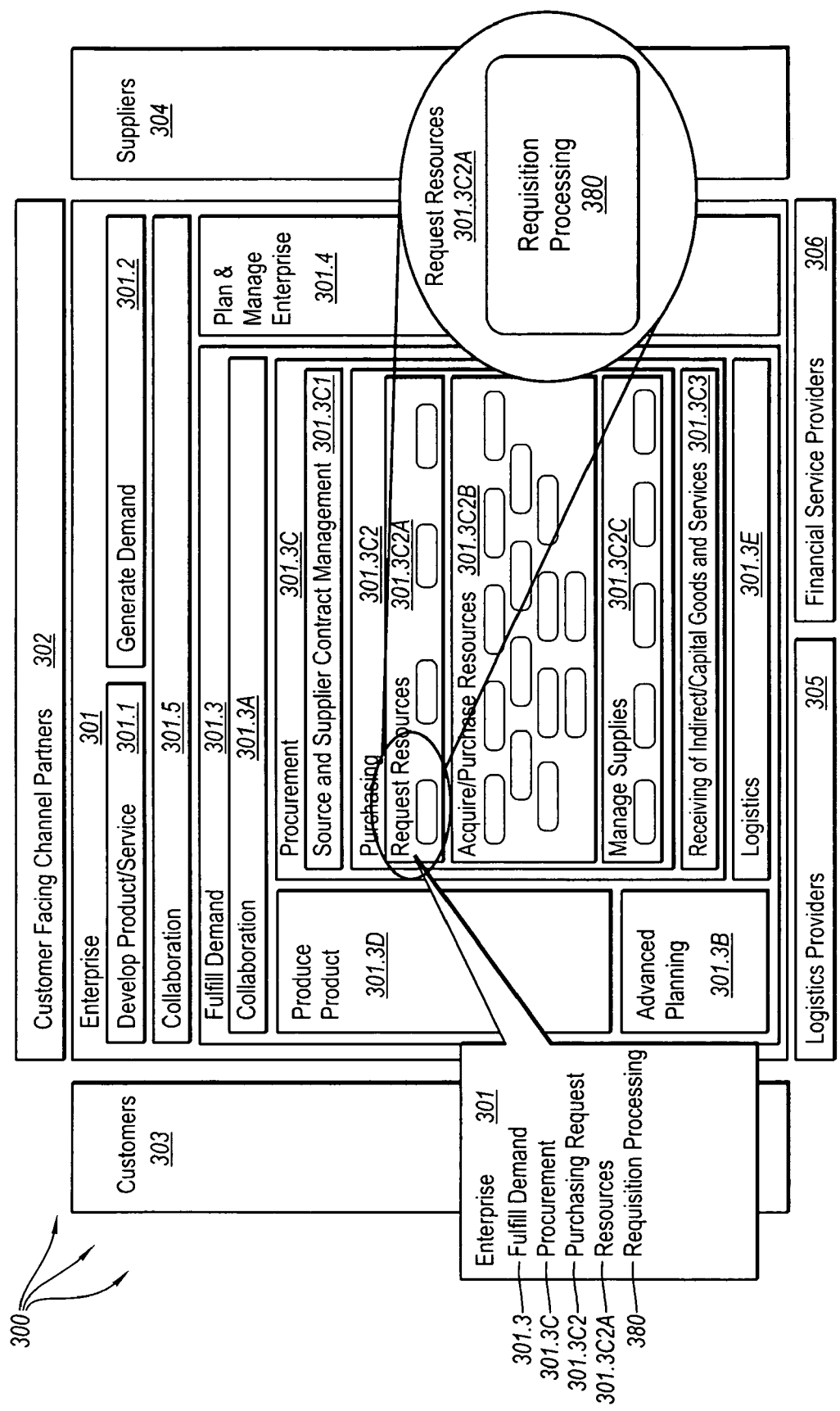

Turning now to FIG. 3B, FIG. 3B depicts visual representation 300 with further levels of detail. FIG. 3B is representative of the way business capabilities can be broken down/decomposed into other capabilities. For example, fulfill demand 301.3 is increased by a number of levels of detail. Fulfill demand 301.3 includes collaboration 301.3A, advanced planning 301.3B, procurement 301.3C, produce product 301.3D, and logistics 301.3E. Thus, collaboration 301.3A, advanced planning 301.3B, procurement 601.3C, produce product 301.3D, and logistics 301.3E contribute to the performance of fulfill demand 301.3 (and as a result also contribute to the performance of enterprise 301).

Procurement 301.3C is further detailed to include source and supplier contract management 301.3C1, purchasing 301.3C2, and receiving of indirect/capital goods and services 301.3C3. Thus, contract management 301.3C1, purchasing 301.3C2, and receiving of indirect/capital goods and services 301.3C3 contribute to the performance of procurement 301.3C (and as a result also contribute to the performance of fulfill demand 301.3 and performance of enterprise 301).

Purchasing 301.3C2 is further detailed to include request resources 301.3C2A, acquire/purchase resources 301.3C2B, and manage supplies 301.3C2C. Thus, request resources 301.3C2A, acquire/purchase resources 301.3C2B, and manage supplies 301.3C2C contribute to the performance of purchasing 301.3C2 (and as a result also contribute to the performance of procurement 301.3C, fulfill demand 301.3, and performance of enterprise 301). Requisition processing 380 is a further sub-capability of request resources request resources 301.3C2A.

Figure 3C:
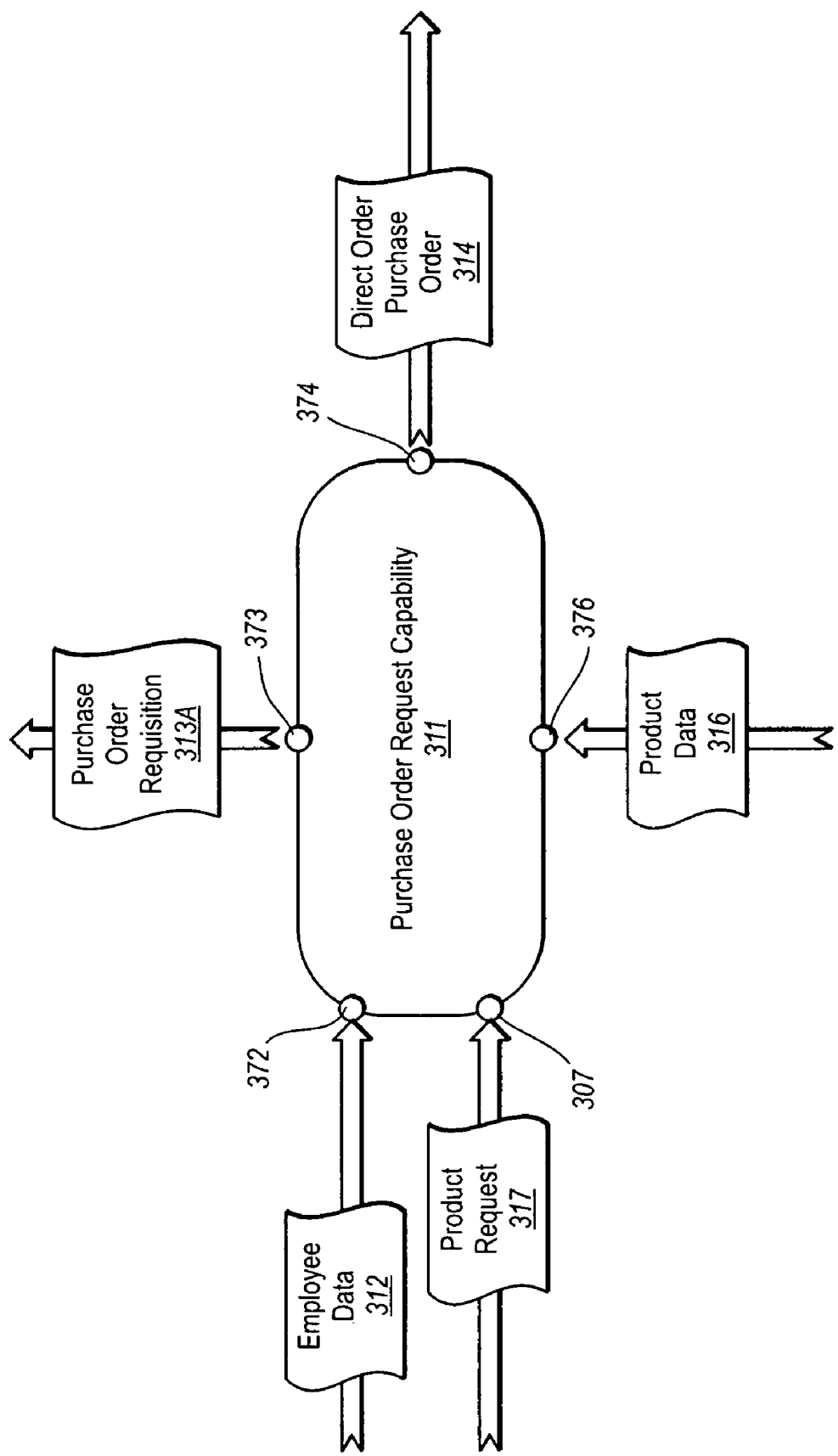
FIG. 3C illustrates an example of a modeled business capability.

Business capability models can also represent data that flows into and data that flows out of the modeled business capabilities. For example, FIG. 3C illustrates an example of a modeled business capability. FIG. 3C, includes purchase order request capability 311 (e.g., modeled based on structured capability data format). Purchase order request capability 311 includes ports 372, 376, and 307 (e.g., modeled based on a structured port data format) that receive employee data 312, product data 316, and product request 317 respectively (e.g., from other business capabilities). Purchase order request capability 311 can use employee data 312, product data 316 and product request 317 to formulate a purchase order request.

Purchase order request capability 311 includes ports 373 and 374 (e.g., modeled based on the structured port data format) that can send purchase order requisition 313A and direct order purchase order 314 respectively (e.g., to other business capabilities). Purchase order request capability 501 can include logic that determines, based on one or more of receive employee data 312, product data 316 and produce request 317, whether purchase order requisition 513A and/or direct order purchase order 314 is to be sent.

Thus, embodiments of the present invention can also utilize models of a network of business capabilities. A first business capability is modeled based upon formatted business capability attributes. A second business capability is modeled based upon the formatted business capability attributes. A connection between the first business capability and the second capability is modeled based upon the formatted business capability attributes.

Figure 3D:
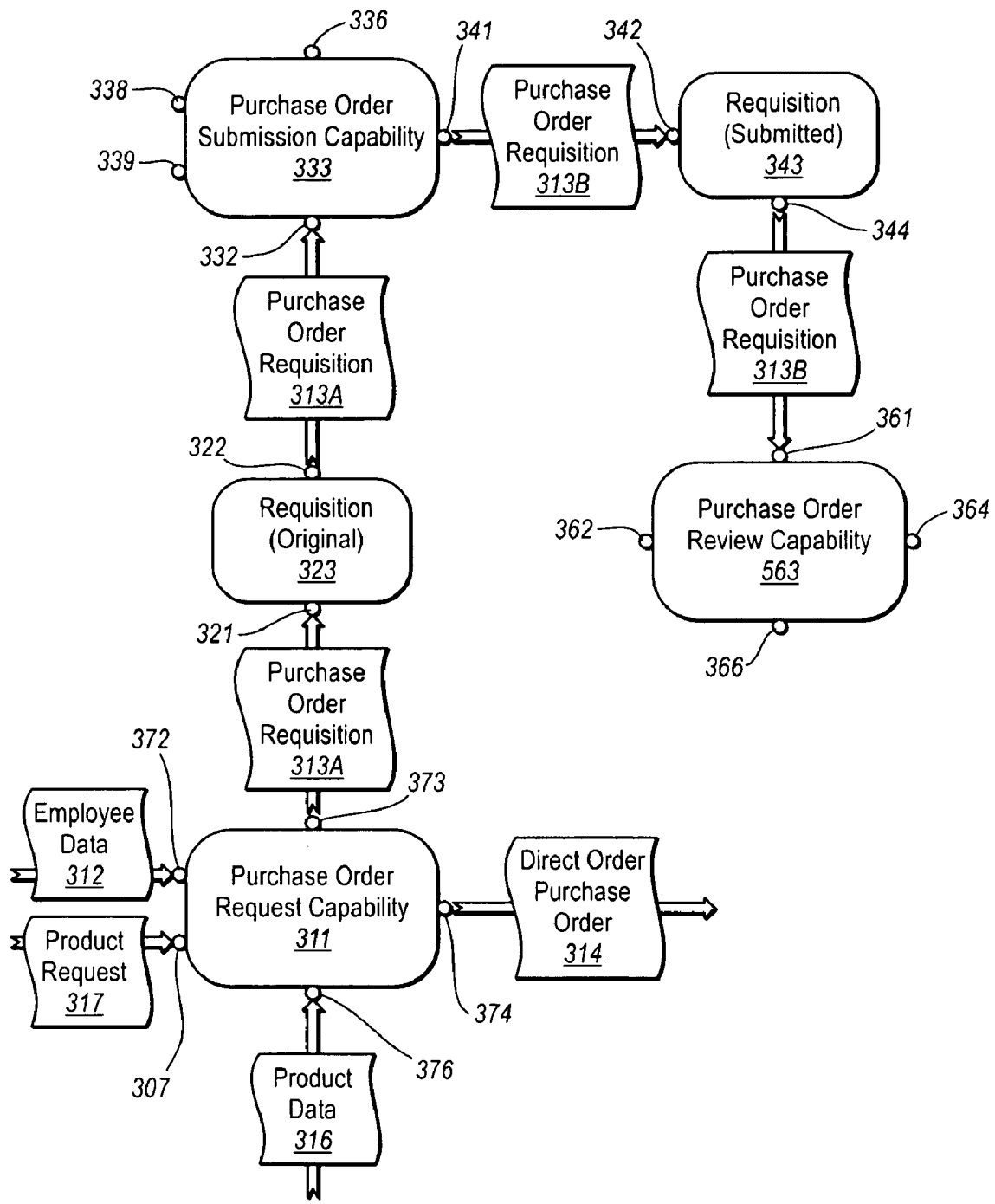
FIG. 3D illustrates a first view of an example of a network of modeled business capabilities.

FIG. 3D illustrates a first view of an example of a network of modeled business capabilities including purchase order request capability 311. As depicted, purchase order request capability 311 (a capability) sends purchase order request 313A out of port 373 to requisition 323 (a connector).

Requisition 323 receives purchase order requisition 313A at port 312. Requisition 323 sends purchase order requisition 313A out of port 322 to purchase order submission capability 333. Thus, requisition 323 transfers purchase order requisition 313A from purchase order request capability 311 to purchase order submission capability 333. Accordingly, a connector can be viewed as a business capability wherein the capability of the connector is to transfer data between other capabilities.

Purchase order submission capability 333 receives purchase order requisition 313A at port 332. Purchase order submission capability 333 includes other ports, including ports 336, 338, 339, and 341. Each of the ports 336, 338, 339, and 341 can be used to send data to and/or receive data from other capabilities or connectors. More specifically, purchase order submission capability 332 sends purchase order 313B out of port 341 to requisition 343 (a connector). Although similar to purchase order requisition 313A, purchase order requisition 313B can differ from purchase order 313A as a result of processing at purchase order submission capability 332.

Requisition 343 receives purchase order requisition 313B at port 342. Requisition 343 sends purchase order requisition 313B out of port 344 to purchase order review capability 363. Purchase order review capability 563 receives purchase order requisition 313B at port 361. Purchase order review capability 363 includes other ports, including ports 362, 364, and 366. Each of the ports 362, 364, and 366 can be used to send data to and/or receive data from other capabilities or connectors.

Although one-way ports and connectors have been depicted in FIG. 3D, it should be understood that embodiments of the present invention can include two-way ports and/or two-way connectors. For example, it may be that, from time to time, requisition 323 also transfers data from purchase order submission capability 333 (coming out of port 332 and into port 322) to purchase order request capability 311 (coming out of port 321 and into port 373). Similarly, it may be that, from time to time, requisition 343 also transfers data from purchase order review capability 363 (coming out of port 361 and into port 344) to purchase order submission capability 333 (coming out of port 342 and into port 341).

Figure 3E:
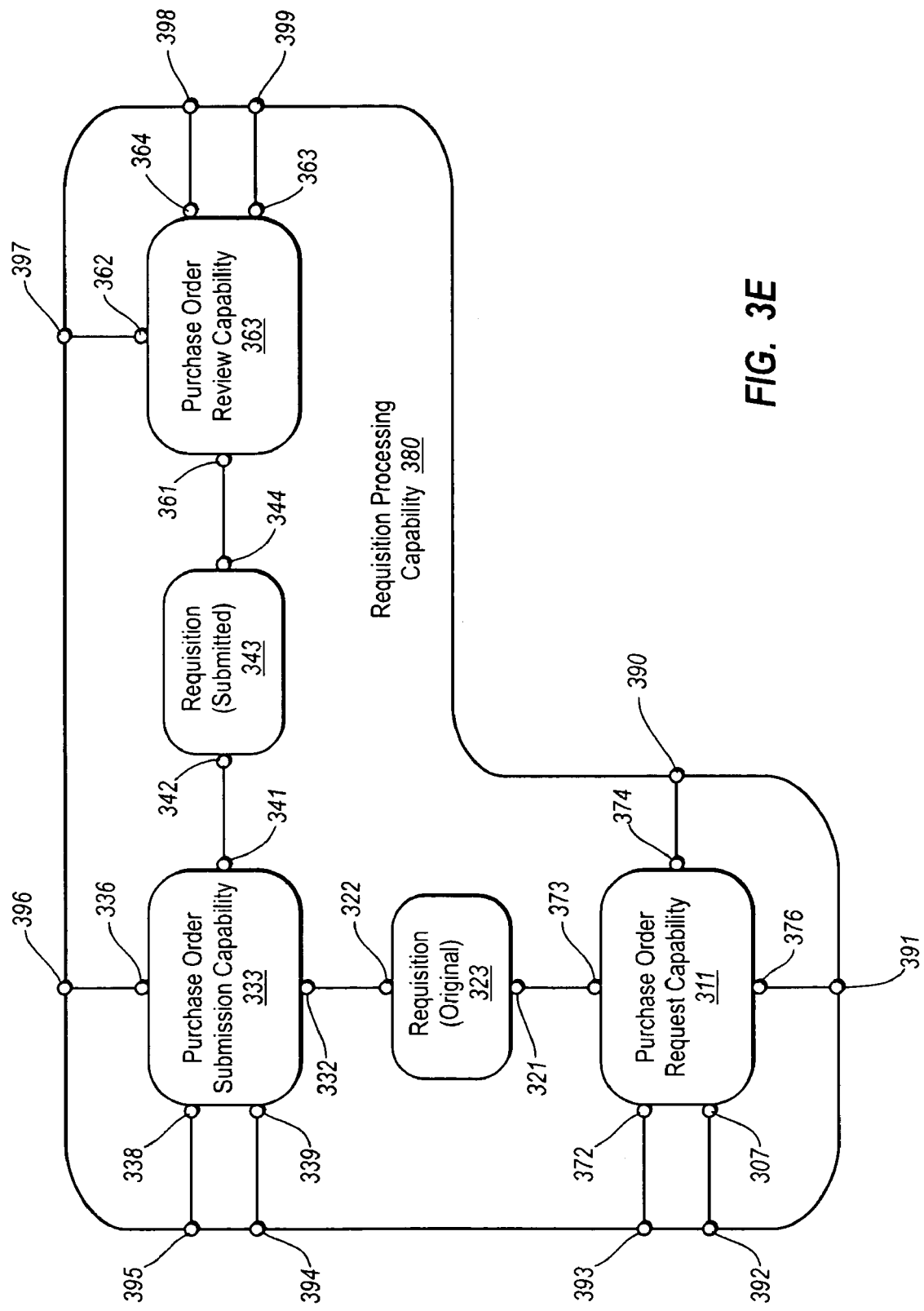
FIG. 3E illustrates a second view of the example of a network of modeled business capabilities.

A network of business capabilities can also be represented in a manner that abstracts the data exchanged between various business capabilities and connectors in the business capability network. Further, in some embodiments and as previously described, a network of more granular business capabilities (or those at higher levels of detail) can be used to model a more coarse business capability (or those at lower levels of detail). FIG. 3E illustrates a second view of the example of a network of modeled business capabilities in FIG. 3D representing requisition processing capability 380 (from FIG. 3B).

The network of business capabilities in FIG. 3E abstracts out the data that is exchanged between the business capabilities and connections in FIG. 3D. FIG. 3E further depicts that the more granular business capabilities and connections in FIG. 3D can be used to model a more coarse requisition processing capability 380. Ports 390-399 represent that requisition processing capability 380 can exchange data with other business capabilities and connectors, for example, included in request resources 301.3C2A (of FIG. 3B) or in part of some other general procurement network of business capabilities.

Although particular models have been described with respect to FIGS. 3A-3E, embodiments of the invention are not so limited. Embodiments of the invention can be practiced with virtually any type of model that represents business capabilities and/or business processes.

It should be understood that schemas for one or more business layers that contribute to business capabilities can include data definitions indicating how the business layers and their entities contribute to business capabilities. Thus, a business capability schema can include data definitions representing links to business layers and/or entities. For example, an entity/layer link schema definitions for contributions from people, process, and technology layers of a business capability.

Figure 4:
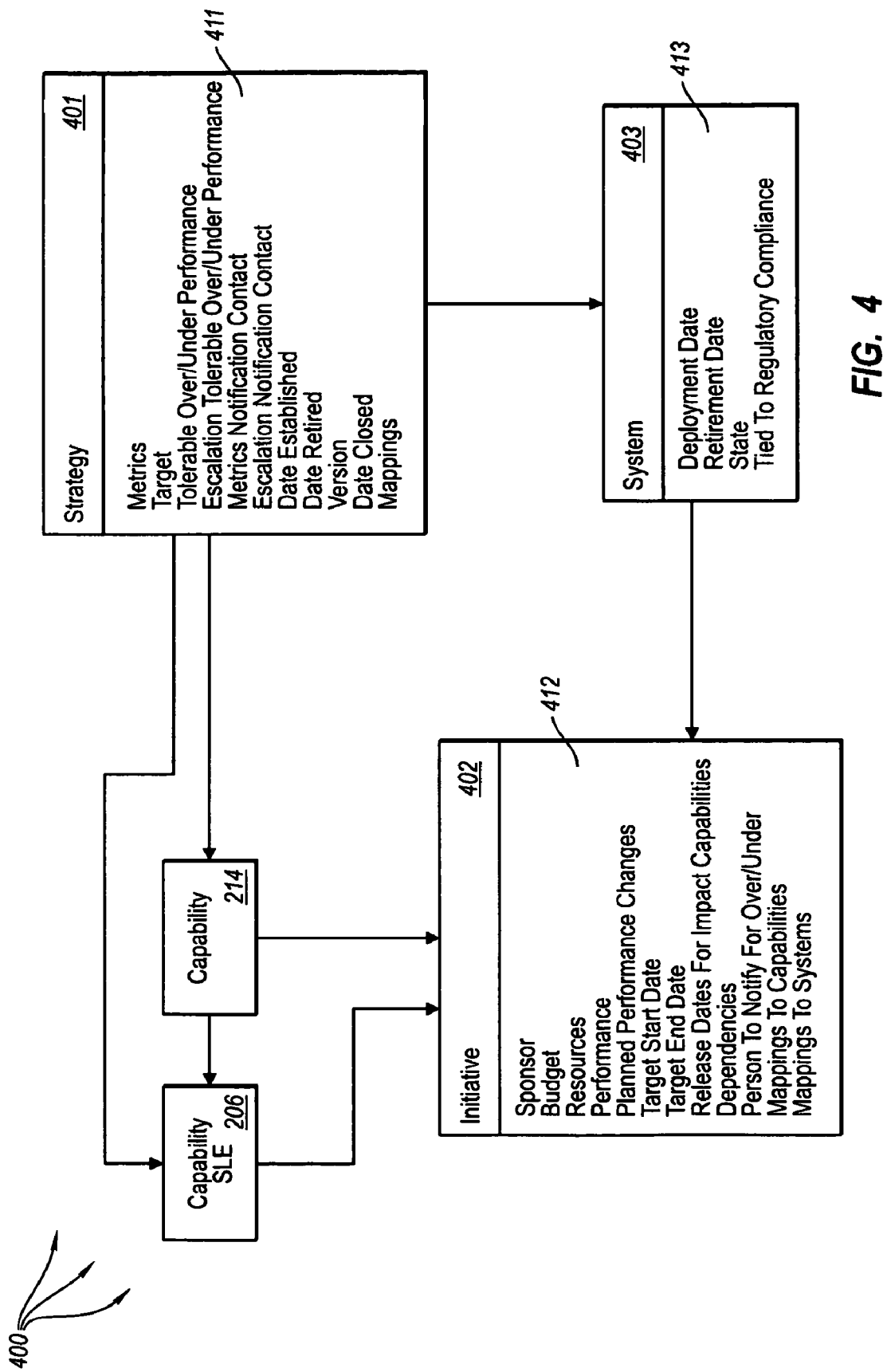
FIG. 4 illustrates a capability schema and capability SLE schema relative to a strategy schema, an initiative schema, and a system schema.

FIG. 4 illustrates capability schema 214 and capability SLE schema 206 relative to strategy schema 401, initiative schema 402, and system schema 403. Strategy schema 401 includes properties 411 that define a data format for organizational strategies. Initiative schema 402 includes properties 412 that define a data format for initiatives to implement a portion of an organizational strategy. System schema 403 includes properties 413 that define a formation for systems that implement an initiative and/or that included in an organizational strategy.

Generally, an organizational strategy data format can be described as indicated in Table 12.

TABLE 12

| Name | Data Type | Description |
|---|---|---|
| Measure 1 of N and there is no limit to the number of metrics that can be associated with a business capability | varchar(1000) | Metrics include, but are not limited to the following measures:<br>Financial (e.g., dollars)<br>Temporal (e.g., seconds)<br>Measured (e.g., low quality)<br>Volume (e.g., cases, or complaints)<br>Binary (yes/no for something like compliance<br>The specific wording of a metric would be Integer + Measure (e.g., five dollars to use the financial example above) per Unit, where a Unit can include:<br>Instance (e.g. each time a capability performs it is an instance)<br>Time (e.g, day, month, quarter)<br>Other (e.g., a work shift is a unit of time that can have specific attributes that can be defined such as the time a concession stand is open for an event, the start/stop may depend on external factors)<br>So measure may be<br>Five dollars per transaction, and that could be a revenue measure or a profit measure. The measure could be<br>35 seconds per call<br>10 complaints per shift<br>14 compliance failures per week<br>11 at low quality per 1,000 made |
| Target | varchar(100) | This is greater than, less than, equal to. So for each metric tied to a business capability, if it is 35 seconds per call, the metric could be equals 35 seconds per call (such as a helpdesk), where any call that is 35 seconds or less meets or exceeds the target metric). It could also be less than 35 seconds per call, in which case any call lasting 35 seconds or longer fails the target metric. |
| Tolerable Over/Under Performance | int | How much variation in performance is tolerated before a variation is noted or notification is sent. For example, when a variance threshold is exceeded an electronic mail message can be sent to appropriate management personnel.<br>To continue the example above, if the target metric is "= 35 seconds per call" then, under 35 seconds would probably not have any issues and thus no over performance limit. An under performance limit, so calls lasting 36 seconds or longer, might be a percentage or a raw number, so +15% (5.4 seconds) might be the under performance threshold that would require contact. |
| Escalation Tolerable Over/Under Performance | int | In some cases, dramatic over/under performance need to be escalated immediately, so in the =35 seconds example, it might be +30% (10.8 seconds) |
| Metrics Notification Contact | varchar(100) | Name, phone number, and E-mail address of contact. |

TABLE 12-continued

| Name | Data Type | Description |
|---|---|---|
| Escalation Notification Contact | varchar(100) | Name, phone number, and E-mail address of contact. |
| Date Established | date | The date this organizational strategy was added. |
| Date Retired | date | The date this organizational strategy was retired, if applicable. |
| Version | | As business capability matures along with the organization, a metric may need to be tuned for a variety of reasons. There may be a new regulation that restricts performance, or the organization may simply get better at doing the work, or they may decide to switch from a volume metric to a quality metric. In any case, it can be very valuable to store metrics history for both audit trail as well as before and after comparative use, when trying to establish the actual causes of performance changes. |
| Date Closed | date | When a version of a metric is retired, it can be helpful and important to now specifically when this happened. |
| Mappings | | Mappings to capabilities that contribute to performance of the organizational strategy |

Generally, an initiative data format can be described as indicated in Table 13.

TABLE 13

| Name | Data Type | Description |
|---|---|---|
| Sponsor | varchar(100) | Speaks to the accountability of the initiative. |
| Budget | int | Initiatives typically have explicit budgets, overall or in phases and that's what this value captures |
| Resources | varchar(100) | Specifics of the people, processes, and technology resources that will be deployed to execute the initiative |
| Performance | int | Sstatus of the initiative in terms of performance relative to goals (reduced costs per month, increased customer satisfaction, increased customer requests per month). Like metric in 0072 above, this would often be an =, >, < followed by an integer or a % |
| Planned Performance Change | int | Specifics of the metrics of the business capabilities that will change. If they are currently handling an average of 4,512 customer requests per month, the new target is 6,000 with no increase in personnel. |
| Target Start Date | date | Initiative kick-off date |
| Target End Date | date | Initiative wrap-up date |
| Release Dates For Impacted Capabilities | date | As the "new" versions of the capabilities emerge, when will those new versions be active and available. |
| Dependencies | | Large initiatives can have collisions or complements in the sense that they touch the same capabilities or touch capabilities that directly contribute to the performance of capabilities in the initiative. This is a catch to identify the capabilities that may have dependencies to other initiatives or milestones or projects or other things. So this should include, or at least link to, the name of the capability, the specifics of the dependency, the dates, and a comment about the impact. |
| Over/Under Performance | varchar(100) | Name, phone number, and E-mail address of contact |

TABLE 13-continued

| Name | Data Type | Description |
|---|---|---|
| Notification Contact | | Similar to strategy metrics, when an initiative over or under performs there should be a threshold for notification and a contact for when that threshold has been reached. |
| Mappings to Capabilities | | Specific list of the capabilities that are a part of the initiative. |
| Mappings to Systems | | Capabilities may already be mapped to systems, so this may come from inheritance, but the specific technologies that are in scope of the initiative. |

Generally, a system data format can be described as indicated in Table 14.

TABLE 14

| Name | Data Type | Description |
|---|---|---|
| Deployment Date | date | System deployment date |
| Retirement Date | date | System retirement date |
| State | | Deployed, retired, online, offline, etc. |
| Tied to Regulatory Compliance | Logical | Is the system tied to complying with a regulation? YES/NO. |

Figure 5:
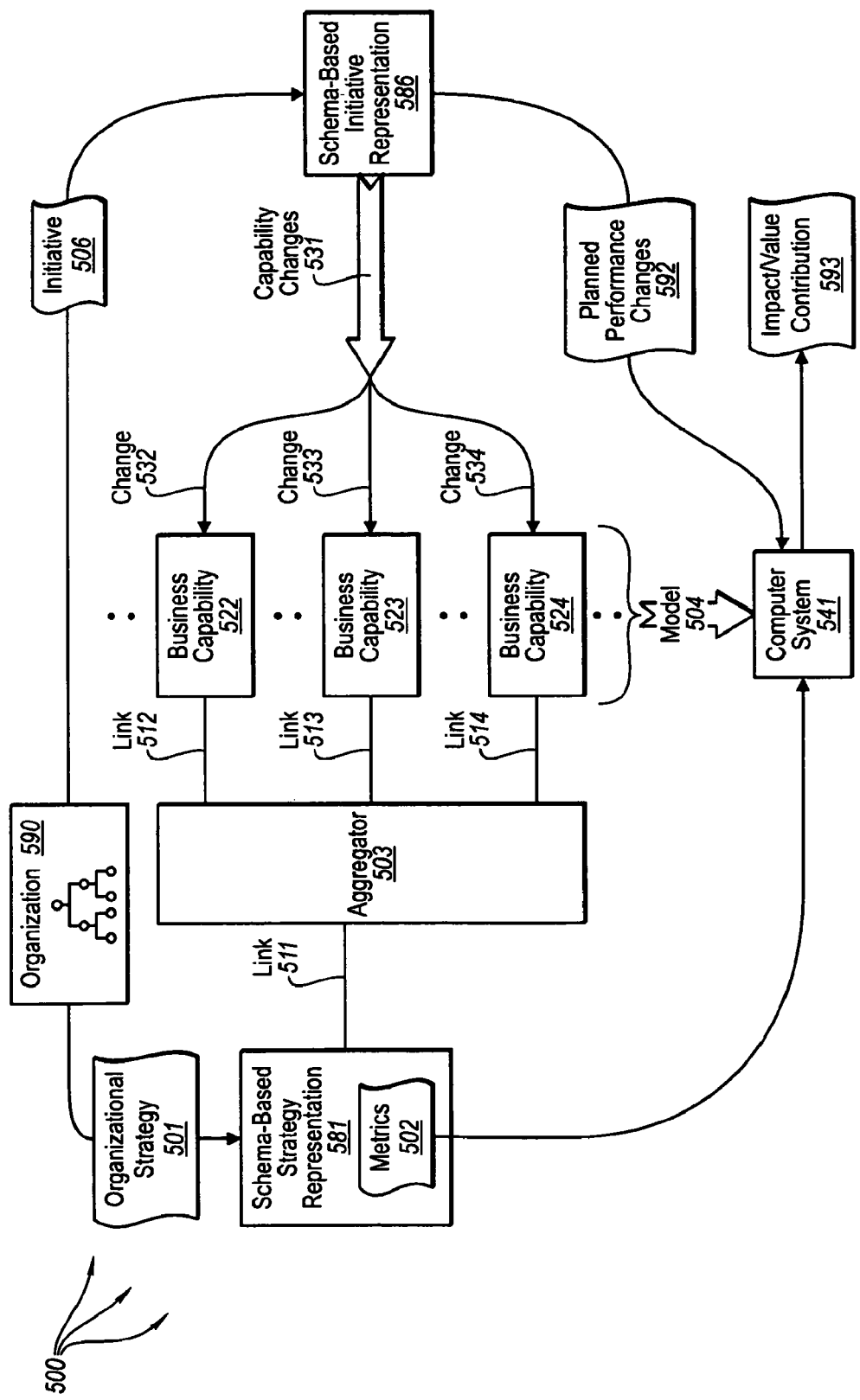
FIG. 5 illustrates an example computer architecture that facilitates determining the benefit of changing business capabilities in accordance with an initiative.

FIG. 5 illustrates an example computer architecture 500 that facilitates determining the benefit of changing business capabilities in accordance with an initiative. As depicted, computer architecture 500 includes computer system 541 and model 504. Model 504 represents a model of the business capabilities of organization 590. Generally, computer system 541 is configured to access model 504 and determines if business capability changes indicated in an initiative have a planned impact on an organizational strategy. For example, computer system 541 can determine if capability changes indicated initiative 506 have a planned impact on organizational strategy 501. Computer architecture 500 can organizational strategy into schema-based strategy representation 581 (of organizational strategy) and can convert initiative 506 into schema-based initiative representation 586 (of initiative 506).

Thus, capability changes 531 can include changes 532, 533, and 534 corresponding to business capabilities 522, 523, and 524 respectively. Each change can indicate a change in what work a business capability does. For example, change 532 can indicate a change to what work business capability 522 does.

Schema-based strategy representation 581, business capabilities 522, 523, and 524, and schema-based initiative representation 586 can be modeled in accordance with the schemas in FIGS. 2 and 4. Thus generally, links 512, 513, and 514 can be evaluated to determine impacts on metrics 502 (e.g., key performance indicators). Aggregator 503 is configured to receive one or more links (e.g., 512, 513, and 514) from business capabilities and aggregate the links into a link 511 indicating a contribution to metrics 502. Thus, aggregator 503 can include one or more components to transform, normalize, regulate, etc., received links relative to one another to properly evaluate the contribution of each received link to metrics 502.

Accordingly, embodiments of the invention essentially provide a pre-defined common vocabulary to uniformly consider how changes to business capabilities impact the performance of an organizational strategy. The pre-defined common vocabulary also provides a mechanism to produce consistent repeatable results for considered changes in business capabilities.

A pre-defined business change vocabulary can include a spectrum of change along a plurality of axes. One axis can represent the significance of a change within a range of significance. For example, the significance of a change can range from a managerial adjustment (e.g., live operations) to an organizational strategy. Another axis can represent a level of organizational coordination for implementing the change with a range of levels of organization. For example, organization levels can range from implementation, to business capabilities, to company, to business, to industry.

Figure 7:
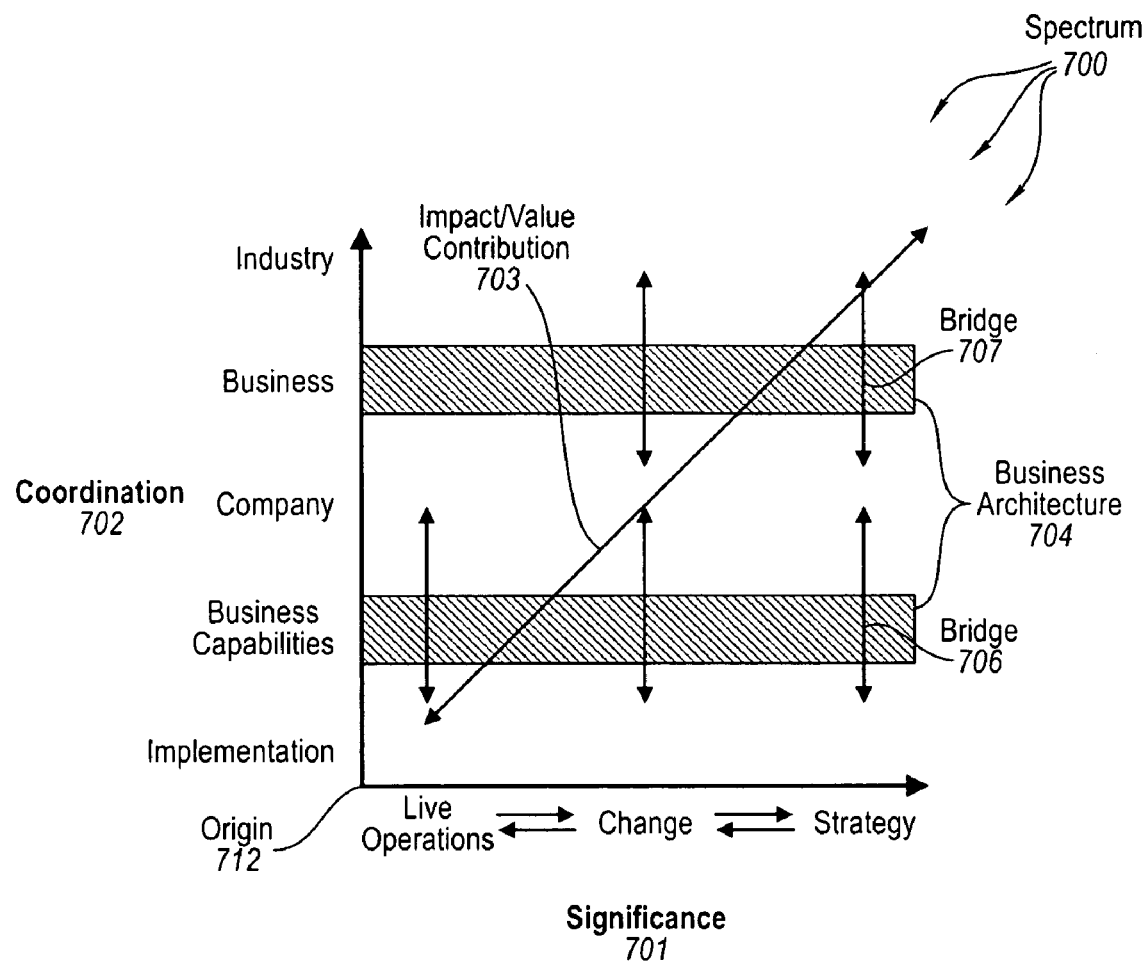
FIG. 7 illustrates an impact/value spectrum.

In some embodiments, axes can be used to represent a grid. The grid can be used to estimate the cost associated with a change. The cost can then be compared against models implementing the change to determine if the change is worthwhile, for example, in view of time cost and constraints, disruption impact, risk, financial impact (e.g., results in increase revenue, savings, cuts costs, etc.). For example, referring briefly to FIG. 7, FIG. 7 depicts spectrum 700. As depicted, change spectrum 700 includes significance axis 701 and coordination axis 702. Along significance axis 701 the significance of change varies in range between live operations and strategy. Likewise, along coordination axis 402 the level of coordination for implementing a change increases from implementation, to business capabilities, to company, to business, to industry Impact/value contribution 703 generally represents an impact and/or value to an organization of performing a change of a specified significance and a specified level of coordination. Thus, as the significance of a change increases so does the impact/value. For example, there is likely more impact/value to implementing an change to an organizational strategy than to adjusting a live operation to better meet existing goals. Likewise, as the organization coordination for change increases so does the impact/value. For example, there is likely more impact/value to change an business wide business capability than to change an implementation setting. Thus, as change moves away from origin 712 (either vertically or horizontally) the impact/value associated with change increases. Generally, impact/value represents impact and/or value on organizational resources, such as, for example, one or more of financial, material, technical, personnel resources, time, disruption impact, and risk.

Further, impact/value contribution 703 generally indicates that impact/value increases as significance and level of coordination move away from origin 712. However, there is not necessarily a linear relationship between significance and level of coordination. Depending on the business capabilities for an organization and proposed changes to the business capabilities, the relationship between significance and level of coordination can result in a logarithmic impact/value curve, an exponential impact/value curve, or a curve based on virtually any other function.

When the cost for a change is under impact/value contribution 703 (or any other impact/value curve) then there is at least some objective evidence that the change is justified and/or worthwhile to an organization (e.g., is cost efficient to apply). For example, below an impact/value cure, an organization may make more from changed business capabilities than it costs to implement the change. On the other hand, when the cost for a change is over impact/value contribution 703 (or any other impact/value curve) then there is at least some objective evidence that the change is not justified and/or worthwhile to an organization. For example, above an impact/value cure, an organization may not recoup from changed business capabilities what it costs to implement the change.

Business architecture 704 represents a plurality of modeled business capabilities (internal and/or external) modeling a business. Business architecture 704 can be used to bridge between various levels of coordination at various levels of significance. For example, bridge 706 indicates that business architecture 704 can facilitate movement from implementation changes to company wide changes for an organizational strategy. Similarly, bridge 707 indicates that business architecture 704 can facilitate movement from company wide changes to industry wide changes for an organizational strategy. Thus, within a spectrum of different types of changes impact/value contributions can uniformly be determined.

Figure 6:
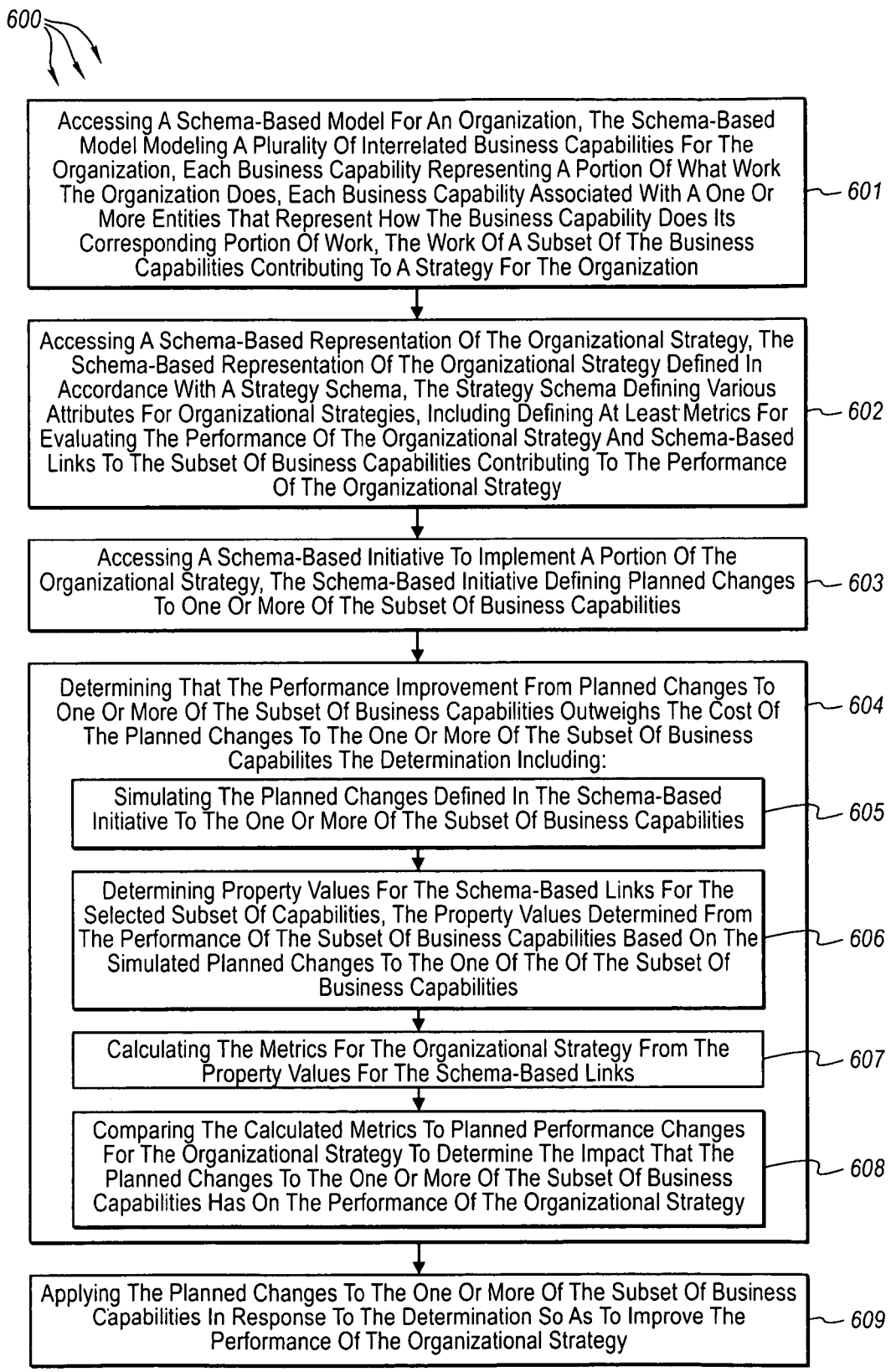
FIG. 6 illustrates an example flowchart of a method linking organizational strategies to performing capabilities.

FIG. 6 illustrates an example flowchart of a method 600 linking organizational strategies to performing capabilities. The method 600 will be described with respect to the components and data in computer architecture 500 and spectrum 700.

Method 600 includes an act of accessing a schema-based model for an organization, the schema-based model modeling a plurality of interrelated business capabilities for the organization, each business capability representing a portion of what work the organization does, the work of a subset of the business capabilities contributing to a strategy for the organization (act 601). For example, computer system 541 can access model 504 for organization 590. Model 504 can model interrelated business capabilities for organization 590, including business capabilities 522, 523, and 524. Business capabilities 522, 523, and 524 (as well as the one or more other business capabilities) can contribute to organizational strategy 501. For example, values in fields for business capabilities 522, 523, and 524, include CapabilitySLEs, for can contribute to values for metrics 502.

Method 500 includes an act of accessing a schema-based representation of the organizational strategy, the schema-based representation of the organizational strategy defined in accordance with a strategy schema, the strategy schema defining various attributes for organizational strategies, including defining at least metrics for evaluating the performance of the organizational strategy and schema-based links to the subset of business capabilities contributing to the performance of the organizational strategy (act 502). For example, computer system 541 can access schema-based representation 581 (of organizational strategy 501). Schema-based strategy representation 581 can be defined in accordance with schema 401. Thus, schema-based strategy representation 581 can be defined to include metrics for evaluating organizational strategy 501 and links to business capabilities 522, 523, 524, etc.

Method 600 includes an act of accessing a schema-based initiative to implement a portion of the organizational strategy, the schema-based initiative defining planned changes to one or more of the subset of business capabilities (act 603). For example, computer system 541 can access schema-based initiative representation 586. Schema-based initiative representation 586 can be defined in accordance with schema 402. Thus, schema-based initiative representation 586 can be defined to include planned changes for one or more business capabilities, including business capabilities 522, 523, and 524.

Method 600 includes an act determining that the performance improvement from planned changes to one or more of the subset of business capabilities outweighs the cost of the planned changes to the one or more of the subset of business capabilities (act 604). For example, computer system 541 can determine that the performance of planned business capability changes in initiative 506 outweighs the cost of the planned business capability changes in initiative 506.

Method 600 can include an act of simulating the planned changes defined in schema-based initiative to the one or more of the subset of business capabilities (act 605). For example, computer system 541 can simulate changes 532, 533, and 534 to business capabilities 522, 523, and 524 respectively. Method 600 includes an act of determining property values for the schema-based links for the selected subset of capabilities, the property values determined from the performance of the subset of business capabilities based on the simulated planned changes to the one of the of the subset of business capabilities (act 606). For example, computer system 541 can determine values for links 512, 513, and 514. The values for links 512, 513, and 514 can be determined from the performance of business capabilities 522, 523, and 524 based on and/or subsequent to simulated changes 532, 533, and 534 respectively.

Method 600 includes an act of calculating the metrics for the organizational strategy from the property values for the schema-based links (act 607). For example, computer system 541 can calculate metrics 502 from links 512, 513, and 514. Aggregator 503 can then aggregate links 512, 513, and 514 (representing performance based on changes 532, 533, and 534 respectively) into link 511. Link 511 can then be used to populate metrics 502. Method 600 includes an act of comparing the calculated metrics to planned performance changes for the organizational strategy to determine the actual impact that the planned performance changes to the one or more of the subset of business capabilities has on the performance of the organizational strategy (act 608). For example, computer system 451 can compare metrics 502 to plan performance changes 592 to determine the actual impact of capability changes 531 on organizational strategy 501. Computer system 541 can generate impact/value contribution 593 for capability changes 531.

Method 600 includes an act of applying the planned changes to the one or more of the subset of business capabilities in response to the determination so as to improve the performance of the organizational strategy (act 609). For example, if based on impact/value contribution 593, capability changes 531 are worthwhile, computer system 541 can more permanently apply capability changes 531 to model 504. Capability changes can be viewed as worthwhile when they meet or exceed planned performance changes, resulting in increased performance of an organizational strategy. For example, if metrics 502 indicate that planned performance changes 592 are met or exceeded through implementing changes 531, changes 531 can be more permanently implemented in model 504.

In some embodiments, the linkage between business capabilities and their contribution to strategy metrics is an active link. That is, the linkage facilitates monitoring of operations/tactics on an ongoing basis. Accordingly, embodiments of the invention permit an organization to monitor operations/tactics related to a strategy on an ongoing basis. If operations/tactics trend outside of tolerance ranges for specified metrics, the organization can implement corrective action. Corrective action can include revising initiatives for further business capability changes such that operations/tactics trend back within tolerance ranges.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture, a computer-implemented method for determining what impact a change in performance of a business capability has on an organizational strategy, the method comprising:

an act of a computing system accessing a schema-based model for an organization, the schema-based model modeling a plurality of interrelated business capabilities for the organization, each business capability representing a portion of what work the organization does, the work of a subset of the business capabilities contributing to a strategy for the organization, the computing system including at least one processor;

an act of the computing system accessing a schema-based representation of the organizational strategy, the schema-based representation of the organizational strategy defined in accordance with a strategy schema, the strategy schema defining various attributes for organizational strategies, including defining at least metrics for evaluating the performance of the organizational strategy and schema-based links to the subset of business capabilities contributing to the performance of the organizational strategy;

an act of the computing system accessing a schema-based initiative to implement a portion of the organizational strategy, the schema-based initiative defining planned changes to one or more of the subset of business capabilities;

an act of the computing system determining that the performance improvement from planned changes to one or more of the subset of business capabilities outweighs the cost of the planned changes to the one or more of the subset of business capabilities, the determination including:

an act of the computing system simulating the planned changes to the one or more of the subset of business capabilities of the schema-based initiative;

an act of the computing system determining property values for the schema-based links for the selected subset of capabilities, the property values determined from the performance of the subset of business capabilities based on the simulated planned changes to the one of the of the subset of business capabilities;

an act of the computing system calculating the metrics for the organizational strategy from the property values for the schema-based links; and an act of the computing system comparing the calculated metrics to planned performance changes for the organizational strategy to determine the actual impact that the planned performance changes to the one or more of the subset of business capabilities has on the performance of the organizational strategy; and an act of applying the planned changes to the one or more of the subset of business capabilities in response to the determination so as to improve the performance of the organizational strategy.

2. The method as recited in claim 1, wherein the act of accessing a schema-based model for an organization comprises an act of accessing a business capability model, wherein at least some business capabilities have a schematized service level expectation.

3. The method as recited in claim 1, further comprising an act of identifying the subset of business capabilities contributing to a strategy for the organization from the schema-based representation of the initiative.

4. The method as recited in claim 1, wherein the act of simulating the planned changes to the one or more of the subset of business capabilities of the schema-based initiative comprises an act of simulating planned changes to a plurality of interconnected business capabilities.

5. The method as recited in claim 1, wherein the act of simulating the planned changes to the one or more of the subset of business capabilities of the schema-based initiative comprises an act of simulating planned changes to a plurality of interconnected business capabilities.

6. The method as recited in claim 1, wherein the act of simulating the planned changes to the one or more of the subset of business capabilities of the schema-based initiative comprises an act of simulating planned changes that impact the service level expectation of at least once business capability that contributes to the metrics of the schema-based strategy representation.

7. The method as recited in claim 1, wherein the act of calculating the metrics for the organizational strategy from the property values for the schema-based links comprises an act of aggregating contributions to the metrics from each of the business capabilities in the subset of capabilities.

8. The method as recited in claim 1, wherein the act of comparing the calculated metrics to planned performance changes for the organizational strategy comprises an act of determining that the metrics indicate that the performance of the organizational strategy is operating within performance thresholds.

9. The method as recited in claim 1, further comprising determining that planned changes can be implemented in a cost efficient manner.

10. The method as recited in claim 1, further comprising:

an act of converting the organizational strategy into the schema-based strategy representation through reference to the strategy schema; and an act of converting an initiative for implementing part of the organizational strategy into the schema-based initiative representation through reference to an initiative schema.

11. A computer program product for use in a computer architecture, the computer program product for implementing a method for determining what impact a change in performance of a business capability has on an organizational strategy, the computer program product comprising one or more computer storage media having stored thereon computer-executable instructions that, when executed at a processor, cause the computer architecture to perform the method, including the following access a schema-based model for an organization, the schema-based model modeling a plurality of interrelated business capabilities for the organization, each business capability representing a portion of what work the organization does, the work of a subset of the business capabilities contributing to a strategy for the organization;

access a schema-based representation of the organizational strategy, the schema-based representation of the organizational strategy defined in accordance with a strategy schema, the strategy schema defining various attributes for organizational strategies, including defining at least metrics for evaluating the performance of the organizational strategy and schema-based links to the subset of business capabilities contributing to the performance of the organizational strategy;

access a schema-based initiative to implement a portion of the organizational strategy, the schema-based initiative defining planned changes to one or more of the subset of business capabilities;

determine that the performance improvement from planned changes to one or more of the subset of business capabilities outweighs the cost of the planned changes to the one or more of the subset of business capabilities, the determination including:

simulating the planned changes to the one or more of the subset of business capabilities of the schema-based initiative;

determining property values for the schema-based links for the selected subset of capabilities, the property values determined from the performance of the subset of business capabilities based on the simulated planned changes to the one of the of the subset of business capabilities;

calculating the metrics for the organizational strategy from the property values for the schema-based links; and comparing the calculated metrics to planned performance changes for the organizational strategy to determine the actual impact that the planned performance changes to the one or more of the subset of business capabilities has on the performance of the organizational strategy; and apply the planned changes to the one or more of the subset of business capabilities in response to the determination so as to improve the performance of the organizational strategy.

12. The computer program product as recited in claim 11, further comprising computer-executable instructions that, when executed, cause the computer architecture to identify the subset of business capabilities contributing to a strategy for the organization from the schema-based representation of the initiative.

13. The computer program product as recited in claim 11, further comprising computer-executable instructions that, when executed, cause the computer architecture to determine that planned changes can be implemented in a cost efficient manner.

14. The computer program product as recited in claim 11, further comprising computer-executable instructions that, when executed, cause the computer architecture to:

convert the organizational strategy into the schema-based strategy representation through reference to the strategy schema; and convert an initiative for implementing part of the organizational strategy into the schema-based initiative representation through reference to an initiative schema.

15. The computer program product as recited in claim 11, wherein computer-executable instructions that, when executed, cause the computer architecture to calculate the metrics for the organizational strategy from the property values for the schema-based links comprise computer-executable instructions that, when executed, cause the computer architecture to aggregate contributions from each of the business capabilities in the subset of capabilities to the metrics.

16. The computer program product as recited in claim 11, wherein computer-executable instructions that, when executed, cause the computer architecture to compare the calculated metrics to planned performance changes for the organizational strategy comprise computer-executable instructions that, when executed, cause the computer architecture to determine that the metrics indicate that the performance of the organizational strategy is operating within performance thresholds.

17. In a computer architecture, a computer-implemented method for determining what impact a change in performance of a business capability has on a business strategy, the method comprising:
   an act of a computing system accessing a schema-based business architecture model for a business, the schema-based business architecture model modeling a plurality of interrelated business capabilities for the business, each business capability representing a portion of what work the business does, at least one business capability being internal to a company and at least once business capability being external to the company, the business architecture model bridging between the company and an industry so that the company can develop industry wide business strategies, the computing system including at least one processor;
   an act of the computing system accessing a schema-based representation of the business strategy for the company, the schema-based representation of the business strategy defined in accordance with a strategy schema, the strategy schema defining various attributes for business strategies, including defining at least metrics for evaluating the performance of the business strategy and schema-based links to a subset of business capabilities contributing to the performance of the business strategy,
   an act of the computing system accessing a schema-based initiative to implement a portion of the business strategy, the schema-based initiative defining planned changes to an identified subset of one or more business capabilities, including at least one internal business capability and at least one external business capability;
   an act of the computing system determining that the performance improvement from planned changes to one or more of the subset of business capabilities outweighs the cost of the planned changes to the one or more of the subset of business capabilities, the determination including:
      an act of the computing system simulating the planned changes to the one or more of the subset of business capabilities of the schema-based initiative;
      an act of the computing system determining property values for the schema-based links for the selected subset of capabilities, the property values determined from the performance of the subset of business capabilities based on the simulated planned changes to the one of the of the subset of business capabilities;
      an act of the computing system calculating the metrics for the business strategy from the property values for the schema-based links; and
      an act of the computing system comparing the calculated metrics to planned performance changes for the business strategy to determine the actual impact that the planned performance changes to the one or more of the subset of business capabilities has on the performance of the business strategy; and
   an act of applying the planned changes to the one or more of the subset of business capabilities in response to the determination so as to improve the performance of the business strategy for the company.

18. The method as recited in claim 17, wherein the act of calculating the metrics for the business strategy from the property values for the schema-based links comprises an act of aggregating contributions to the metrics from each of the business capabilities in the subset of capabilities.

19. The method as recited in claim 17, wherein the act of comparing the calculated metrics to planned performance changes for the business strategy comprises an act of determining that the metrics indicate that the performance of the business strategy is operating within performance thresholds.

20. The method as recited in claim 17, further comprising determining that planned changes can be implemented in a cost efficient manner.

* * * * *

UNITED STATES PATENT AND TRADEMARK OFFICE
CERTIFICATE OF CORRECTION

| | | |
|---|---|---|
| PATENT NO. | : 8,150,726 B2 | Page 1 of 1 |
| APPLICATION NO. | : 12/242430 | |
| DATED | : April 3, 2012 | |
| INVENTOR(S) | : Merrifield, Jr. et al. | |

It is certified that error appears in the above-identified patent and that said Letters Patent is hereby corrected as shown below:

IN THE SPECIFICATION:

In column 8, line 8, after "schema" insert -- 200 --.

In column 17, line 39, delete "Sstatus" and insert -- Status --, therefor.

In column 18, line 62, after "strategy" insert -- 501 --.

In column 19, line 48, after "industry" insert -- . --.

In column 21, line 32, after "one of the" delete "of the".

IN THE CLAIMS:

In column 22, line 67, In Claim 1, after "one of the" delete "of the".

In column 24, line 36, In Claim 11, after "one of the" delete "of the".

In column 26, line 19, In Claim 17, after "one of the" delete "of the".

Signed and Sealed this
Tenth Day of February, 2015

Michelle K. Lee
*Deputy Director of the United States Patent and Trademark Office*